US006691153B1

(12) United States Patent
Hanson et al.

(10) Patent No.: US 6,691,153 B1
(45) Date of Patent: *Feb. 10, 2004

(54) METHOD AND SYSTEM FOR PROCESS INTERACTION AMONG A GROUP

(75) Inventors: Michael Hanson, Menlo Park, CA (US); Graham Miller, San Francisco, CA (US); Brian Axe, San Francisco, CA (US); Steven Richard Evans, Los Altos Hills, CA (US)

(73) Assignee: Zaplet, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/483,508

(22) Filed: Jan. 14, 2000

Related U.S. Application Data

(63) Continuation-in-part of application No. 09/427,152, filed on Oct. 25, 1999, now Pat. No. 6,505,233, and a continuation-in-part of application No. 09/426,648, filed on Oct. 25, 1999, now Pat. No. 6,463,461, and a continuation-in-part of application No. 09/427,378, filed on Oct. 25, 1999, now Pat. No. 6,496,849.
(60) Provisional application No. 60/151,650, filed on Aug. 31, 1999, and provisional application No. 60/151,476, filed on Aug. 30, 1999.

(51) Int. Cl.[7] .............................................. G06F 15/16
(52) U.S. Cl. ....................................... 709/204; 709/205
(58) Field of Search ................................. 709/204, 205

(56) References Cited

U.S. PATENT DOCUMENTS

| 4,503,499 A | 3/1985 | Mason et al. |
| 4,567,600 A | 1/1986 | Massey et al. |
| 4,645,873 A | 2/1987 | Chomet |
| 5,043,876 A | 8/1991 | Terry |
| 5,089,954 A | 2/1992 | Rago |
| 5,093,901 A | 3/1992 | Cree et al. |
| 5,093,918 A | 3/1992 | Heyen et al. ............... 395/725 |
| 5,129,057 A | 7/1992 | Strope et al. |
| 5,161,214 A | 11/1992 | Addink et al. |
| 5,245,532 A | 9/1993 | Mourier |

(List continued on next page.)

FOREIGN PATENT DOCUMENTS

| EP | 0 739 115 A2 | 10/1996 |
| EP | 0 959 592 A2 | 11/1999 |
| EP | 1 085 444 A2 | 3/2001 |

OTHER PUBLICATIONS

Goldberg et al., *Active Mail–A Framework for Implementing Groupware* CSWC Proceedings Nov. 1992: 75–83.

Brothers et al., *Supporting Informal Communication Via Ephemeral Interest Groups* CSWC Proceedings Nov. 1992: 84–90.

(List continued on next page.)

*Primary Examiner*—Saleh Najjar
(74) *Attorney, Agent, or Firm*—Hickman Palermo Truong & Becker LLP

(57) ABSTRACT

A method and system are described that can be used to support a process interaction among a group of participants connected to a network. A participant completes an electronic form specifying the subject matter of the process interaction and a list of network addresses corresponding to other participants in the interaction. A server receives the form and includes resources for delivering an electronic mail message associated with an electronic medium associated with the interaction. When the participant opens the message, the electronic medium is produced by the server that includes static and dynamic regions. The participant can add comments to the interaction or direct the process interaction using an interaction region. The dynamic regions are asynchronously updated in the server and indicate the current content of the electronic medium that can be accessed by other participants.

31 Claims, 19 Drawing Sheets

U.S. PATENT DOCUMENTS

| | | |
|---|---|---|
| 5,299,305 A | 3/1994 | Oomae et al. |
| 5,325,310 A | 6/1994 | Johnson et al. |
| 5,363,507 A | 11/1994 | Nakayama et al. |
| 5,377,354 A | 12/1994 | Scannell et al. |
| 5,392,400 A | 2/1995 | Berkowitz et al. |
| 5,408,470 A | 4/1995 | Rothrock et al. |
| 5,410,646 A | 4/1995 | Tondevold et al. |
| 5,418,908 A | 5/1995 | Keller et al. ................. 395/200 |
| 5,428,784 A | 6/1995 | Cahill, Jr. |
| 5,535,332 A | 7/1996 | Ishida |
| 5,537,142 A | 7/1996 | Fenouil |
| 5,555,426 A | 9/1996 | Johnson et al. |
| 5,557,723 A | 9/1996 | Holt et al. ................... 395/149 |
| 5,579,472 A | 11/1996 | Keyworth, II et al. ...... 395/326 |
| 5,592,626 A | 1/1997 | Papadimitriou et al. |
| 5,602,841 A | 2/1997 | Lebizay et al. |
| 5,608,872 A | 3/1997 | Schwartz et al. |
| 5,615,269 A | 3/1997 | Micali |
| 5,617,539 A | 4/1997 | Ludwig et al. |
| 5,632,018 A | 5/1997 | Otorii |
| 5,647,002 A | 7/1997 | Brunson |
| 5,664,207 A | 9/1997 | Crumpler et al. |
| 5,687,317 A | 11/1997 | Hughes et al. |
| 5,689,642 A | 11/1997 | Harkins et al. ........ 395/200.04 |
| 5,692,125 A | 11/1997 | Schloss et al. ............. 395/209 |
| 5,706,452 A | 1/1998 | Ivanov |
| 5,727,165 A | 3/1998 | Ordish et al. |
| 5,732,400 A | 3/1998 | Mandler et al. |
| 5,744,670 A | 4/1998 | Motoyuki et al. .......... 585/320 |
| 5,757,669 A | 5/1998 | Christie et al. |
| 5,781,732 A | 7/1998 | Adams |
| 5,790,677 A | 8/1998 | Fox et al. |
| 5,794,207 A | 8/1998 | Walker et al. |
| 5,796,396 A | 8/1998 | Rich |
| 5,799,191 A | 8/1998 | Moriyasu et al. |
| 5,799,320 A | 8/1998 | Klug |
| 5,819,032 A | 10/1998 | de Vries et al. ......... 395/200.8 |
| 5,819,092 A | 10/1998 | Ferguson et al. ........... 395/701 |
| 5,819,274 A | 10/1998 | Jackson, Jr. |
| 5,821,925 A | 10/1998 | Carey et al. |
| 5,825,883 A | 10/1998 | Archibald et al. |
| 5,826,242 A | 10/1998 | Montulli ..................... 705/27 |
| 5,835,713 A | 11/1998 | Fitzpatrick et al. |
| 5,842,178 A | 11/1998 | Giovannoli |
| 5,848,396 A | 12/1998 | Gerace |
| 5,850,430 A | 12/1998 | Hamalainen |
| 5,850,517 A | 12/1998 | Verkler et al. |
| 5,855,020 A | 12/1998 | Kirsch |
| 5,862,223 A | 1/1999 | Walker et al. |
| 5,862,330 A | 1/1999 | Anupam et al. ....... 395/200.34 |
| 5,872,924 A | 2/1999 | Nakayama et al. |
| 5,884,035 A | 3/1999 | Butman et al. |
| 5,884,325 A | 3/1999 | Bauer et al. |
| 5,892,761 A | 4/1999 | Stracke, Jr. ................. 370/395 |
| 5,897,622 A | 4/1999 | Blinn et al. |
| 5,905,863 A | 5/1999 | Knowles et al. |
| 5,909,689 A | 6/1999 | Van Ryzin |
| 5,911,045 A | 6/1999 | Leyba et al. |
| 5,913,040 A | 6/1999 | Rakavy et al. |
| 5,913,920 A | 6/1999 | Adams et al. |
| 5,918,054 A | 6/1999 | Jury et al. ................... 395/712 |
| 5,923,848 A * | 7/1999 | Goodhand et al. .......... 709/219 |
| 5,926,798 A | 7/1999 | Carter |
| 5,930,471 A | 7/1999 | Milewski et al. |
| 5,933,811 A | 8/1999 | Angles et al. |
| 5,937,160 A | 8/1999 | Davis et al. |
| 5,937,161 A | 8/1999 | Mulligan et al. |
| 5,944,785 A | 8/1999 | Pommier et al. |
| 5,945,989 A | 8/1999 | Freishtat et al. |
| 5,948,057 A | 9/1999 | Berger et al. |
| 5,948,070 A | 9/1999 | Fujita |
| 5,951,652 A * | 9/1999 | Ingrassia, Jr. et al. ...... 709/248 |
| 5,956,693 A | 9/1999 | Geerlings |
| 5,960,404 A | 9/1999 | Chaar et al. .................... 705/8 |
| 5,963,947 A | 10/1999 | Ford et al. |
| 5,966,512 A | 10/1999 | Bates et al. |
| 5,970,470 A | 10/1999 | Walker et al. |
| 5,970,479 A | 10/1999 | Shepherd |
| 5,974,430 A | 10/1999 | Mutschler, III et al. .... 707/505 |
| 5,978,836 A | 11/1999 | Ouchi |
| 5,987,376 A | 11/1999 | Olson et al. |
| 5,995,096 A | 11/1999 | Kitahara et al. |
| 5,995,097 A | 11/1999 | Tokumine et al. |
| 6,006,200 A | 12/1999 | Boies et al. |
| 6,009,410 A | 12/1999 | LeMole et al. |
| 6,012,083 A | 1/2000 | Savitzky et al. |
| 6,012,090 A | 1/2000 | Chung et al. |
| 6,014,502 A | 1/2000 | Moraes .................. 395/200.49 |
| 6,014,644 A | 1/2000 | Erickson |
| 6,014,688 A | 1/2000 | Venkatraman et al. |
| 6,023,686 A | 2/2000 | Brown |
| 6,025,841 A | 2/2000 | Finkelstein et al. ......... 345/342 |
| 6,041,308 A | 3/2000 | Walker et al. |
| 6,044,205 A | 3/2000 | Reed et al. ............ 395/200.31 |
| 6,044,403 A | 3/2000 | Gerszberg et al. |
| 6,047,311 A | 4/2000 | Ueno et al. ................. 709/202 |
| 6,049,787 A | 4/2000 | Takahashi et al. |
| 6,055,519 A | 4/2000 | Kennedy et al. |
| 6,055,522 A * | 4/2000 | Krishna et al. ............. 715/517 |
| 6,084,883 A | 7/2000 | Norrell et al. |
| 6,092,074 A | 7/2000 | Rodkin et al. |
| 6,105,055 A * | 8/2000 | Pizano et al. ............... 709/204 |
| 6,115,384 A | 9/2000 | Parzych |
| 6,134,534 A | 10/2000 | Walker et al. |
| 6,134,582 A | 10/2000 | Kennedy .................... 709/206 |
| 6,141,010 A * | 10/2000 | Hoyle ........................ 345/356 |
| 6,144,991 A * | 11/2000 | England ..................... 709/205 |
| 6,151,588 A | 11/2000 | Tozzoli |
| 6,151,621 A * | 11/2000 | Colyer et al. ............... 709/204 |
| 6,155,840 A * | 12/2000 | Sallette ....................... 434/323 |
| 6,161,137 A | 12/2000 | Ogdon et al. ............... 709/224 |
| 6,161,149 A | 12/2000 | Achacoso et al. ............. 710/4 |
| 6,173,316 B1 | 1/2001 | De Boor et al. ............ 709/218 |
| 6,182,052 B1 | 1/2001 | Fulton et al. .................. 705/26 |
| 6,185,602 B1 | 2/2001 | Bayrakeri ................... 709/204 |
| 6,205,478 B1 | 3/2001 | Sugano et al. .............. 709/223 |
| 6,212,549 B1 * | 4/2001 | Page et al. ................... 709/205 |
| 6,212,553 B1 | 4/2001 | Lee et al. .................... 709/206 |
| 6,219,054 B1 | 4/2001 | Komoda et al. ............. 345/353 |
| 6,226,670 B1 | 5/2001 | Ueno et al. ................. 709/207 |
| 6,230,156 B1 | 5/2001 | Hussey ........................ 707/10 |
| 6,230,171 B1 * | 5/2001 | Pacifici et al. .............. 715/512 |
| 6,230,185 B1 | 5/2001 | Salas et al. .................. 709/205 |
| 6,247,045 B1 | 6/2001 | Shaw et al. ................. 709/207 |
| 6,260,124 B1 | 7/2001 | Crockett et al. ............ 711/162 |
| 6,317,777 B1 | 11/2001 | Skarbo et al. .............. 709/204 |
| 6,334,141 B1 * | 12/2001 | Varma et al. ............... 709/205 |
| 6,336,134 B1 | 1/2002 | Varma ........................ 709/205 |
| 6,338,086 B1 | 1/2002 | Curtis et al. ................ 709/218 |
| 6,446,113 B1 * | 9/2002 | Ozzie et al. ................ 709/204 |
| 6,457,045 B1 * | 9/2002 | Hanson et al. ............. 709/206 |
| 6,463,461 B1 * | 10/2002 | Hanson et al. ............. 709/204 |
| 6,484,196 B1 * | 11/2002 | Maurille ..................... 709/206 |
| 6,505,242 B2 * | 1/2003 | Holland et al. ............. 709/219 |
| 2003/0028607 A1 | 2/2003 | Miller et al. |

OTHER PUBLICATIONS

Borenstein, Nathaniel S., *Computational Mail as Network Infrastructure for Computer–Supported Cooperative Work* CSWC Proceedings Nov. 1992: 67–74.

James E. Pitkow, et al., "Towards an intelligent publishing environment," Computer Networks and ISDN Systems, 1995, pp. 729–737.

J. Palme, et al., "MIME Encapsulation of Aggregate Documents, Such As HTML (MHTML)," Mar. 1999, XP 002209393, pp. 1–28.

IBM Corp, IBM Technical Disclosure Bulletin, "Method for Managing Files Referenced in In–Basket Items," vol. 36, No. 07, Jul. 1993, p. 469.

S. Dharap et al., "Multi–user distributed specification environments for Z," Technical report, Pennsylvania State University (1992), pp. 1–29.

S. Dharap et al., "The Z–Specificator: A multi–user distributed specification environment," Tecnical report, Pennsylvania State University (1992), pp. 1–26.

S. Dharap, "Coordinating Concurrent Development in Distributed Environments," Ph.D. thesis, Pennsylvania State University Department of Computer Science (May, 1995), pp. 1–98.

"Lotus Notes 5 Releasestep by Step, A Beginner's Guide to Lotus Notes," 1995–1999, pp. 1–228.

"Quick Courses in Microsoft Outlook 2000," Microsoft Press, Online Press Inc., 1999, pp. 1–148.

* cited by examiner

FIG. 8

| BETA | DISCUSSION ZAPLET: | Presidential debates |

701 { ▷ SENT BY: BETH STEARNS | THUR, DEC. 2, 1999 2:55:30 PM
      View this Zaplet on the Web  Send a Discussion Zaplet  More Zaplets...

BACKGROUND INFORMATION ~725
Let's discuss the candidates for president after tonight's debate.

① SUBMIT YOUR COMMENT

1. Please enter some personal information so we can keep track of your response:
   Your comment:

[ 702 ] ~715

YOUR NAME: [ 703 ]

YOUR EMAIL: [ 704 ]

[SUBMIT] [RESET]
     706      707

② DISCUSSION HISTORY
No comments have been received yet        } 709
③ SHARE THIS DISCUSSION WITH OTHERS

FORWARD TO: [ 720 ]  [FORWARD ZAPLET]
                                    721
                            700

FIG. 9

| BETA | DISCUSSION ZAPLET: | Presidential debates |
|---|---|---|

701 { ▷ SENT BY: BETH STEARNS | THUR, DEC. 2, 1999 2:55:30 PM
View this Zaplet on the Web  Send a Discussion Zaplet  More Zaplets...

BACKGROUND INFORMATION  ~725
Let's discuss the candidates for president after tonight's debate.

① SUBMIT YOUR COMMENT

1. Please enter some personal information so we can keep track of your response:
   Your comment:

[ 702 ]  ~715

YOUR NAME: [ 703 ]

YOUR EMAIL: [ 704 ]

[ SUBMIT ] [ RESET ]
   706        707

② DISCUSSION HISTORY

Beth Stearns     I'm sure I'll have lots to say right after the debate ends.  } 709
2-Dec-99, 3:04:08 PM PST

③ SHARE THIS DISCUSSION WITH OTHERS

FORWARD TO: [ 720 ]   [ FORWARD ZAPLET ]
                                   721

FIG. 10                        ↖—700

ORDER TRACKING (AUTHOR VIEW)

YOUR NAME: 801  YOUR EMAIL: 802

SEND TO: 803

TRACKING NUMBER: 804

COMMENTS: 805

*ORDER TRACKING RECEIVED VIEW I*

ORDER TRACKING DETAIL
This will show the progress of the package I sent.
Each time you view this, it will show the current status of the package.

901 — Tracking Number :12 435 5XW 0347
Service Type :Ground
Weight :7.00 lbs
Shipped On :Nov 1, 1999
Shipped To :Redwood City, CA, US

YOUR COMMENTS: — 915

902

| PACKAGE PROGRESS | | | |
|---|---|---|---|
| DATE | TIME | LOCATION | ACTIVITY |

Nov 1  11:31pm  US       Manifest Recv'd
       9:55pm   Seattle  Departure Scan

908

YOUR NAME: 903
YOUR EMAIL: 904

SUBMIT  RESET
  906     907

RECIPIENT COMMENTS:
John Doe -Can't wait to receive.
909 — Jack Public -
Jim Nausium -
Ben Dover -

ORDER TRACKING RECEIVED VIEW II

ORDER TRACKING DETAIL

This will show the progress of the package I sent.
Each time you view this, it will show the current status of the package.

901 — Tracking Number : 12 435 5XW 0347
Service Type : Ground
Weight : 7.00 lbs
Shipped On : Nov 1, 1999
Shipped To : Redwood City, CA, US

YOUR COMMENTS: 915

902

908

| PACKAGE PROGRESS | | | |
|---|---|---|---|
| DATE | TIME | LOCATION | ACTIVITY |

| | | | |
|---|---|---|---|
| Nov 5, 1999 | 3:27pm | San Bruno San Mateo | Delivery |
| Nov 4 1999 | 4:16pm | San Bruno | Unload Scan |
| | 2:12pm | San Bruno | Destination Scan |
| | 12:14pm | San Bruno | Arrival Scan |
| | 7:15am | Roseburg, OR | Arrival Scan |
| Nov 1, | 11:31pm | US | Manifest Rec'd |
| | 9:55pm | Seattle | Departure Scan |

YOUR NAME: 903

YOUR EMAIL: 904

SUBMIT   RESET
906       907

RECIPIENT COMMENTS:
John Doe - Can't wait to receive.
Jack Public - I'm looking forward
  to it's arrival.
Jim Nausium - It's here!
Ben Dover - Just saw it.
  Amazing!

CONCERT TICKET GROUP PURCHASE

① AUTHORING VIEW

| YOUR NAME: | 1001 | YOUR EMAIL: | 1002 |

SEND TO: 1003
(e.g., JohnDoe@ayz.com)

SUBJECT: 1004

Please describe the activity you are trying to schedule

DESCRIPTION: 1005

TYPE OF EVENT: CONCERT ▽    DATE:
LOCATION:                   TIME:
ADDRESS:                    TOTAL PRICE:
                            PRICE PER TICKET:
                            NUMBER OF TICKETS:

YOUR COMMENTS:
1006

② *RECEIVED VIEW I*

LET'S GO SEE THE ROLLING STONES!
If we use this group purchase service, we can all sit together. The first 10 people to sign up and purchase tickets get to go!

1101

Location: Oakland Coliseum
Date/Time: Friday Feb. 20, 2000, 8pm
Price Per Ticket: $100.00
Tickets Still Available: 8 out of 10

YOUR COMMENTS: 1115
1102

YOUR NAME: 1103
YOUR EMAIL: 1104

1105
WILL YOU COME
○ YES  ○ NO

SUBMIT  RESET
1106    1107

1109
INVITEE LIST
John Doe - Sign up quick! They're not getting younger.
Jack Public - I love buying things via email!
Suzie Q Q -
Jim Nausium -
Phil Harmonic -
Ben Dover -

PAYMENT INFORMATION
1110
NAME ON CARD:
CARD NUMBER:         EXP:
BILLING ADDRESS:
CITY:
STATE:      ZIP:
COUNTRY:

② *RECEIVED VIEW II*

LET'S GO SEE THE ROLLING STONES!
If we use this group purchase service, we can all sit together. The first 10 people to sign up and purchase tickets get to go!

1101 —

Location: Oakland Coliseum
Date/Time: Friday Feb. 20, 2000, 8pm
Price Per Ticket: $100.00
Tickets Still Available: 5 out of 10

YOUR NAME: 1103

YOUR EMAIL: 1104

YOUR COMMENTS: 1115
1102

1105
WILL YOU COME
○ YES  ○ NO

SUBMIT 1106   RESET 1107

PAYMENT INFORMATION

NAME ON CARD:
CARD NUMBER:         EXP:
BILLING ADDRESS:
CITY:
STATE:    ZIP:
COUNTRY:

1110

1109
INVITEE LIST
John Doe -Sign up quick! They're not getting younger.
Jack Public - I love buying things via email!
Suzie Q Q - I can't wait!
Jim Nausium - Party at my place before!
Phil Harmonic - Yes! I'm so in.
Ben Dover - No response

① *AUTHORING VIEW*

| YOUR NAME: | 1201 | YOUR EMAIL: | 1202 |

SEND TO: 1203

PURCHASE ORDER NUMBER: 1204

COMMENTS: 1205

1206 —
- INVOICE AMOUNT:
- PAYMENT DUE DATE:
- APPROVAL DUE DATE:
- PURCHASE DESCRIPTION: QTY:
- LIST PRICE:   SOLD TO:
- OUR PRICE:    SOLD BY:

1207 — MUST BE APPROVED BY: ▽ (select all that apply)

② *RECEIVED VIEW I*

PURCHASE ORDER APPROVAL

Please review and approve ASAP. Need to make sure this is reflected in Q4 numbers.

SOLD TO: XYZ CORP.  SOLD BY: ABC COMPUTING
PURCHASE ORDER NUMBER:

1301

| QTY | DESCRIPTION | ITEM# | LIST PRICE | OUR PRICE | TOTAL |
|---|---|---|---|---|---|
| 12 | LAPTOPS | 12345 | $1000 | $900 | $10,800 |
| 24 | PRINTERS | 45678 | $2000 | $1500 | $36,000 |
| 36 | MONITORS | 32105 | $3000 | $2000 | $82,000 |
| 48 | SCSI CABLES | 47396 | $50 | $50 | $2,400 |

APPROVAL DUE DATE:  DECEMBER 15, 1999
PAYMENT DUE DATE:  DECEMBER 31, 1999

YOUR NAME: 1303

YOUR EMAIL: 1304

YOUR COMMENTS:

1302

1315

1310

MUST BE APPROVED BY:
John Doe -  ⊚ approve
 Looks good to me  ○ disapprove
Jack Public -  ○ approve
 Ok.  ○ disapprove
Jim Nausium -  ○ approve
  ○ disapprove
Ben Dover -  ○ approve
  ○ disapprove

③ RECEIVED VIEW II

PURCHASE ORDER APPROVAL

Please review and approve ASAP. Need to make sure this is reflected in Q4 numbers.

SOLD TO: XYZ CORP.        SOLD BY: ABC COMPUTING
PURCHASE ORDER NUMBER:

| QTY | DESCRIPTION | ITEM# | LIST PRICE | OUR PRICE | TOTAL |
|---|---|---|---|---|---|
| 12 | LAPTOPS | 12345 | $1000 | $900 | $10,800 |
| 24 | PRINTERS | 45678 | $2000 | $1500 | $36,000 |
| 36 | MONITORS | 32105 | $3000 | $2000 | $82,000 |
| 48 | SCSI CABLES | 47396 | $50 | $50 | $2,400 |

APPROVAL DUE DATE:  DECEMBER 15, 1999
PAYMENT DUE DATE:  DECEMBER 31, 1999

1301

YOUR NAME: 1303
YOUR EMAIL: 1304
YOUR COMMENTS:
1302

MUST BE APPROVED BY:
John Doe -                    ⊙ approve
  Looks good to me    ○ disapprove
Jack Public -                 ⊙ approve
  Ok.                              ○ disapprove
Jim Nausium -              ○ approve
  Monitor is wrong!     ⊙ disapprove
Ben Dover -                  ○ approve
  Monitor is wrong!     ⊙ disapprove
  Please fix and re-submit.

(1) AUTHORING VIEW

| | |
|---|---|
| YOUR NAME: 1401 | YOUR EMAIL: 1402 |

SEND TO: 1403

AUCTION SITE: EBAY 1404 ▽

AUCTION ITEM NUMBER: 1405

② RECEIVED VIEW I

This is a current auction I'm bidding in. Let me know what you think of the item and the bidding action.

1501 — AUCTION SITE: EBAY
AUCTION ITEM NUMBER: 12345678
AUCTION ITEM: Les Paul Guitar (Signed by Jimi Hendrix)

1502 — BID HISTORY

| Bidder | Comment | Bid Amount | QTY |
|---|---|---|---|
| John Doe | I'm gonna win | $300.00 | 1 |
| Jim Bob | - | $295.00 | 1 |
| Betty Lou | - | $200.00 | 1 |
| Hector Med | - | $175.00 | 1 |
| Auction Junkie | - | $160.00 | 1 |

1503 — AUCTION INFO:
Current Bid: $300
Time Left: 4 Days
# of bids: 5
Closes: Dec. 15, 1999, 21:49pst

1515

PLACE A BID
$ 1528
Password: 1529

SUBMIT    RESET
  1526      1527

YOUR NAME: 1523
YOUR EMAIL: 1524
YOUR COMMENTS:
1522

1506
COMMENTS
John Doe - Pay up to $1200. It's very rare.
Jack Public -
Jim Nausium -
Phil Harmonic -

③ RECEIVED VIEW II

This is a current auction I'm bidding in. Let me know what you think of the item and the bidding action.

1501 — AUCTION SITE
AUCTION ITEM NUMBER
AUCTION ITEM

1502 — BID HISTORY

| Bidder | Comment | Bid Amount | QTY |
|---|---|---|---|
| Jack Public | I'll outbid you all day long!! | $1700.00 | 1 |
| Rock & Roller | - | $1500.00 | 1 |
| Jimi Far | - | $1275.00 | 1 |
| Collector 1 | - | $1100.00 | 1 |
| John Doe | I'm gonna win | $300.00 | 1 |
| Jim Bob | - | $295.00 | 1 |
| Betty Lou | - | $200.00 | 1 |
| Hector Med | - | $175.00 | 1 |
| Auction Junkie | - | $160.00 | 1 |

1503 — AUCTION INFO:
Current Bid: $1700
Time Left: 1 Day
# of bids: 9
Closes: Dec. 15, 1999, 21:49pst 1515 — PLACE A BID
$ 1528
Password: 1529
SUBMIT  RESET
1526   1527

YOUR NAME: 1523
YOUR EMAIL: 1524
YOUR COMMENTS:
1522

1506 — COMMENTS
John Doe - Pay up to $1200. It's very rare.
Jack Public - Thanks for the tip. I'll outbid you all day long!
Jim Nausium - Do whatever you can to buy this!
Phil Harmonic -

FIG. 22

1500 ial application; invented by Michael Hanson, Graham Miller, Brian Axe, and Steve Evans; and such applications are incorporated by referenced as if fully set forth herein.

METHOD AND SYSTEM FOR PROCESS INTERACTION AMONG A GROUP

CROSS-REFERENCE TO RELATED APPLICATIONS

The present application is a continuation-in-part application of U.S. Ser. No. 09/427,152 now U.S. Pat. No. 6,505,233 entitled METHOD FOR COMMUNICATING INFORMATION AMONG A GROUP OF PARTICIPANTS, filed Oct. 25, 1999; Ser. No. 09/426,648 now U.S. Pat. No. 6,463,461 entitled SYSTEM FOR COMMUNICATING INFORMATION AMONG A GROUP OF PARTICIPANTS, filed Oct. 25, 1999; and Ser. No. 09/427,378 now U.S. Pat. No. 6,496,849 entitled ELECTRONIC MEDIA FOR COMMUNICATING INFORMATION AMONG A GROUP OF PARTICIPANTS, filed Oct. 25, 1999; invented by Michael Hanson, Graham Miller, and Brian Axe; and such applications are incorporated by reference herein as if fully set forth herein.

PROVISIONAL APPLICATION DATA

The present invention claims priority to U.S. Provisional Patent Application No. 60/151,650, filed Aug. 31, 1999 and No. 60/151,476, filed Aug. 30, 1999, both entitled SYSTEMS AND METHODS FOR MESSAGING WITH DYNAMIC CONTENT, naming inventors Michael Hanson, Graham Miller, and Brian Axe, and is incorporated by reference as if fully set forth herein.

The present application is also related to U.S. Pat. No. 6,457,045 entitled SYSTEM AND METHOD FOR GROUP CHOICE MAKING, filed on the same day as the subject application; and U.S. Pat. No. 6,507,865 entitled METHOD AND SYSTEM FOR GROUP CONTENT COLLABORATION, filed on the same day as the subject application; invented by Michael Hanson, Graham Miller, Brian Axe, and Steve Evans; and such applications are incorporated by referenced as if fully set forth herein.

TECHNICAL FIELD

The present invention relates generally to communication networks, and more particularly, to a method and system of process interaction among a group of participants connected to such networks using a dynamic distribution of data.

BACKGROUND OF THE INVENTION

Currently, many process interaction tools are known that can be used to assist multiple participants to collaborate in working through a process toward a goal. For example, participants can collaboratively have a discussion concerning a problem and devise solutions to the problem.

One type of process interaction tool uses store and forward technology. Initially, a message is sent to participants who are expected to respond to the message. The participants can then read or respond to the message. Once the sender of the message receives input from some or all of the participants, the sender may send a subsequent message back to the participants indicating the result of the process interaction.

This type of process interaction has several drawbacks. The intermediate results of the process interaction are not immediately available to any of the participants in an aggregated form. This prevents participants from making the best possible contribution based on feedback from any of the prior responding participants. Further, each participant may send responses back to the sender of the message in varying formats. This can make aggregating or summarizing responses to the process interaction difficult. Finally, there is no aggregated immediate feedback to a participant as to how his or her input affects the process interaction. Ultimately, the participants are prevented from having a complete picture of the current state of the process interaction.

Another type of process interaction tool is real time conferencing. In this case, an electronic forum is established in which participants exchange ideas. In this operating regime, participants are forced to focus their attention and continually respond during a real time conferencing session. For example, many participants may participate in a telephone conference, video conference, or electronic conference system.

This type of process interaction tool suffers from several drawbacks. One drawback is that real time conferencing requires participants to interact at the same time. This may be unduly burdensome and may be inconvenient to some or all of the participants. Further, real time conferencing typically operates in a proprietary environment. This means that each participant must match-up with complimentary services to participate in the conference. This can require increased cost and additional navigation for and set-up of non-proprietary participants. Additionally, participants may not be able to effectively communicate when the group becomes too large.

Therefore, a need exists for a system and method for process interaction that is easily accessible by a desiring participant, can support a large number of participants, and provides a participant with an aggregated state of the interaction process.

SUMMARY OF THE INVENTION

In general, the present invention is directed to a method and system for process interaction among a group of participants connected to a network. Preferably, an electronic medium having at least one dynamic content region that includes content associated with the process interaction is stored in a server and served to at least one of the participants in response to an open action of an electronic message by the at least one participant. The dynamic content in the at least one dynamic content region may be asynchronously dynamically updated or dynamically retrieved in response to the open action. In this way, the dynamic content in the electronic medium is current when read or accessed by any of the participants and reflects a then current content of the process interaction.

Accordingly, in one aspect, the present invention is directed to a system for process interaction among a group of participants that includes a server having an associated database and adapted to be used in a network. The server generates and sends an electronic message to the participants, and the server generates and sends an electronic medium stored in the database to at least one of the participants in response to a first open action of the electronic message by the at least one participant. An interface in the electronic medium may be used to communicate input from the participants and the input may be associated with a process interaction. At least one dynamic content region having dynamic content associated with the process interaction may be included in the electronic medium, and logic in communication with the database may asynchronously dynamically update and dynamically retrieve the dynamic content associated with the process interaction that is stored in the database.

Implementations of the invention may include one or more of the following. The process interaction may be a discussion, tracking, purchase, collection, approval, or a negotiation. The dynamic content may include concatenated text, links, buttons, and graphics. An external source in data communication with the server may be used to deliver content to the dynamic content region. The electronic medium may include a forwarding region to increase the number of participants. The network system may be adapted to support the Internet or an electronic mail protocol.

In another aspect, the present invention is directed to a process interaction tool that includes a server having a database that is adapted to receive an electronic form. The electronic form may include network addresses associated with each participant in a group and information associated with a process interaction. The server may generate and send an electronic message to each of the network addresses. An electronic medium may be stored in the database and sent to at least one participant in response to a first open action by the at least one participant. The electronic medium may be asynchronously dynamically updated and dynamically retrieved by the server. At least one dynamic content region may be included in the electronic medium that includes dynamic content associated with the process interaction.

In a further aspect, the present invention is directed to a method for a process interaction among a group of participants that includes generating an electronic form having a plurality of network addresses associated with the participants and information associated with a process interaction. The method also includes sending the electronic form to a server and parsing an electronic message received by at least one of the participants from the server in response to an open action by the at least one participant. An electronic medium having at least one dynamic content region may be served in response to an open action by any of the participants. The electronic medium may be stored in a server, and may include a dynamic content region having a then current dynamic content representative of the process interaction. The method may also include asynchronously dynamically updating and dynamically retrieving an input from any of the participants about the process interaction.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 8 is an example of an electronic form for initiating a discussion.

FIG. 9 illustrates an example image of a zaplet for supporting a discussion among a group of participants.

FIG. 10 illustrates an example of an updated image of the zaplet of FIG. 9.

FIG. 11 is an example of an electronic form for tracking.

FIG. 12 illustrates an example image of a zaplet for supporting tracking among a group of participants.

FIG. 13 illustrates an example of an updated image of the zaplet of FIG. 12.

FIG. 14 is an example of an electronic form for a process of group purchase and payment collection.

FIG. 15 illustrates an example image of a zaplet for supporting a process of purchase and payment collection among a group of participants.

FIG. 16 illustrates an example of an updated image of the zaplet of FIG. 15.

FIG. 17 is an example of an electronic form for an approval process.

FIG. 18 illustrates an example image of a zaplet for supporting an approval process among a group of participants.

FIG. 19 illustrates an example of an updated image of the zaplet of FIG. 18.

FIG. 20 is an example of an electronic form for a negotiation process.

FIG. 21 illustrates an example image of a zaplet for supporting a negotiation process among a group of participants.

FIG. 22 illustrates an example of an updated image of the zaplet of FIG. 21.

DESCRIPTION OF THE PREFERRED EMBODIMENTS

Figure 1:
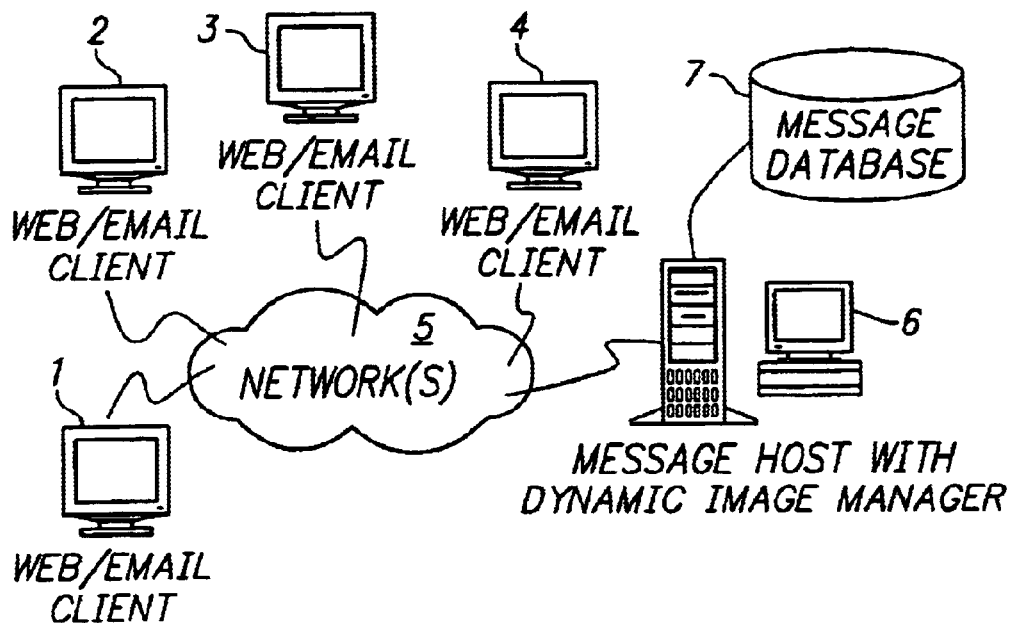
FIG. 1 is a simplified diagram of a sample network including participants of a group connected to the network.

In general, the present invention is directed to a method and system for communicating and collaborating among participants in a group. The method uses an electronic medium having at least one dynamic content region that is stored in a database of a server. Input composed by the participants of the group or other external sources is accepted by the server to update the dynamic content region of the electronic medium in the server. The updating of the dynamic content region is preferably performed asynchronously relative to the sending and receiving of the input from any of the participants or external sources. In this way, the content of the electronic medium is always current.

The invention is based on a principle different from known communication systems i.e. the information communicated between participants of the group is not current when sent by any participant, but current when accessed or read by a participant. The method and system of the invention does not merely rely on sending information that was current when the medium was sent to a receiving participant to communicate information; rather, the current content from the server of the electronic medium is retrieved, when the receiving participant accesses the electronic medium. This means that multiple virtual instances of the electronic medium can be reduced to a single thread. The method and system usefully reduces the amount of media, such as electronic mail messages carrying redundant static content that is communicated among the participants of the group. This invention also makes collaboration of information more rapid and interactive among participants of the group.

The electronic medium can also be updated by a variety of external sources, such as by an attached server containing stock quotes or news feeds. In this way, the electronic medium can be used to supply different types of information to the participant in a fast, efficient, and flexible manner.

A suitable system for the invention is a communication network that is configured with participants that support a variety of protocols, such as those for supporting electronic mail ("e-mail") and the Internet. The electronic media for communicating information and that supports collaboration among participants in a group connected to the network will be referred to as a "zaplet". The zaplet contains static content and dynamic content regions. The term dynamic content can be defined as regions of the zaplet that are retrieved from the server, when the zaplet is accessed by a participant or external source. The term static content can be defined as regions of the zaplet that are not retrieved at the time the zaplet is accessed by a participant or external source. The dynamic content of the zaplet can be changed and updated by the participants in the group or by other external sources, such as an external server containing the most recent news feeds or stock quotes. The content of the zaplet can be stored in a database in a server of the network. The zaplet is also customizable and programmable, containing various text and graphical regions to execute a variety of functions and applications. Preferably, each of the regions may be configured by the participants or the server in the network. When a participant performs an open action to access the zaplet, the zaplet may open and the server serves and displays the then current content in the database to a participant.

An "open action" can be defined as an action by any of the participants or the server that causes the static and/or the dynamic content of the zaplet to be retrieved from the server. For example, an open action may occur when a user invokes the File Open command from a menu bar within an email reading program while an email message containing a zaplet is selected. Alternatively, the server could perform an open action using, for example, push technology processes.

The term collaboration can be defined as an activity in which one or more participants or services share information or points-of-view with an intent of reaching a decision, making a choice, conducting a financial transaction, or sharing knowledge.

The dynamic content can be represented in a dynamic content region in the zaplet, and includes text or images, such as rich text HTML, based on mark-up languages or image construction languages. Consequently, the zaplet can supply all the look and feel possibilities of the World Wide Web ("Web"), and also the participants can experience interactions and collaborate with each other with increased efficiently than in known e-mail systems.

The system and method of the invention makes communication among a group of participants simple. Preferably, the server used to generate and manage the zaplet is scalable for a particular implementation. Its scalability allows quick user response under heavy load conditions on the server. Further, the zaplet can be easily accessed by the participant, such as from a desktop computer. Accordingly, the participant will have constant access to his or her zaplet at all times, and thereby can collaborate with other participants in the group quickly, simply, and efficiently. This means that the participant needs not repeatedly type-in the universal resource locator ("URL") of a portal web site to regain access to a particular application, such as a discussion; the zaplet may be easily accessible and open in an unobtrusive manner.

Unless otherwise defined, all technical and scientific terms used herein have substantially the same meaning as commonly understood by one of ordinary skill in the art to which the invention belongs. Although many methods and systems similar or equivalent to those described herein can be used in the practice of the present invention, suitable methods and systems are described below. Additionally, the methods, systems, and examples described herein are illustrative only and not intended to be limiting.

Other features and advantages of the invention will be apparent from the following detailed description, the drawings, and from the claims.

FIG. 1 illustrates a plurality of participants 1, 2, 3, and 4 of a group that are coupled to a network 5. Any number of participants may be connected to the network 5. The term participant can be defined as an entity or system that is capable of performing or executing a variety of functions on the zaplet as described herein. For simplicity, however, the following description will be made to participants 1–4. Each of the participants 1–4 may include any specific or general computer system that is equipped to receive or read e-mail messages using standard e-mail protocols, such as the Simple Mail Transfer Protocol (SMTP) and the Multipurpose Internet Mail Extensions (MIME), or navigate the Web. The computer may be, for example, a personal computer ("P.C."), an Apple Macintosh, a Unix workstation, or other computing machine that runs a windows-based operating system. A suitable computer may also include a modem, a monitor, a keyboard, a mouse, system software including support for TCP/IP communication, and browser software. Alternatively, the participants 1–4 may include other devices that are capable of transmitting or receiving e-mail messages, forms, or zaplets, such as Palm computers provided by 3Com Corporation, Windows CE-based devices, messaging enabled cellular telephones, pagers, television set top boxes, e.g., Web T.V., or portable computers. The participants 1–4 may further include other devices that are capable of processing text or voice messaging.

The network 5 may be any local or global computer network. For example, the network 5 may be the Internet, a telephone network, a wireless communications network, a satellite communications network, or other similar data networks.

For simplicity, the following description will be made using a system and method configured to support any of the below listed e-mail protocols and data structures. However, the invention can be configured and practiced in any of the above communication networks. For example, voicemail using interactive voice systems could be configured to provide voice messages as current when heard dynamic content.

Each of the participants 1–4 is configured to support a variety of e-mail protocols and mark-up languages, such as SMTP, MIME, Hypertext Mark-up Language ("HTML"), Extensible Mark-up Language ("XML"), Standardized Generalized Mark-up Language ("SGML"), or similar e-mail protocols and/or mark-up languages.

FIG. 1 also shows a server 6 that is connected to the network 5. The server 6 is preferably configured to manage the dynamic content, routing, and updating of electronic forms, messages, or zaplets among the participants 1–4. The server 6 is connected to a message database 7 that is used to manage the dynamic content of zaplets in accordance with the present invention. Other data management resources may also be used.

Figure 2:
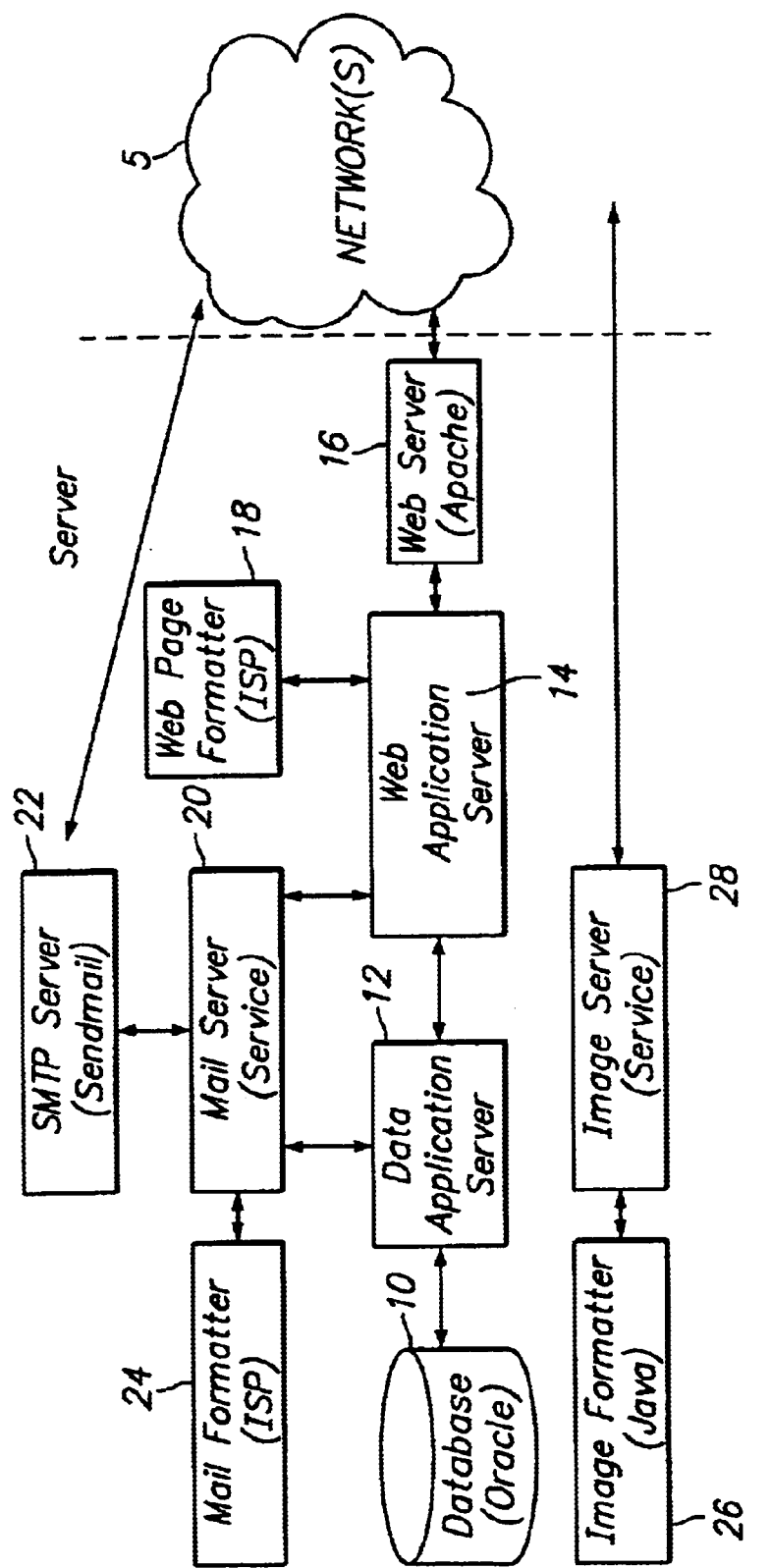
FIG. 2 illustrates a schematic diagram showing data flows of functional components of the network of FIG. 1.

FIG. 2 illustrates a simplified block diagram showing data flows of various functional components of the server 6. The server 6 includes a database 10. The database 10 may be a relational database, such as commercially available from Oracle. The database 10 may include multiple physical databases and may be implemented at a single site or distributed among many sites. The database 10 may also be implemented using object-oriented databases, object-relational databases, or hierarchical file structures.

The database 10 may include information that is specific to any participant or electronic form, message, or zaplet. Contents of the database 10 may include demographic data, participant credit card and payment information, participant preference information, generic form, message, or zaplet information, such as recipients or senders of the group, subject identifiers, or message specific information, and usage statistics for the electronic forms, messages, and zaplets and/or a web site. The database 10 may also store electronic forms that act as blanks for the creation of the zaplets. The database 10 may also include images and web pages used in the creation of the zaplets and also used in the presentation of any dynamic region of the zaplet. The database 10 may also maintain a record of the history of changes that have been made to any dynamic content region of the zaplet discussed below. This record may also be propagated along with any dynamic content to one of the participants parsing the electronic message and zaplet, as discussed below. An example configuration for storing and processing various content in the database 10 is illustrated in the attached Appendix A, which is herein incorporated by reference.

FIG. 2 also shows a data application server 12 is coupled to the database 10. The server 12 is configured with, for example, a set of Java classes or any other high level programming language built using, for example, an Enhydra application server or any of a variety of other tools for object-relational translation. The data application server 12 is used for translating the content in the database 10 into Java objects, for use by a web application server 14. The data application server 12 may also be configured -to cache some data to reduce the load on the database 10.

A web server 16 is included in the server 6 to connect to the participants 1-4. The web server 16 is connected to the web application server 14 and can be any commercially available web server, such as an Apache server. The web server 16 is configured to manage requests from browsers at the participants 1-4, to manage session information, to send and receive forms, or zaplets transmitted to or from the, participants 1-4, and to serve HTML data and static images to the participants 1-4.

The web application server 14 can be configured using a set of Java classes built-on top of the data application server 12. The web application server 14 is responsible for executing business logic associated with the electronic forms, messages, and zaplets. For example, the web application server 14 may manage message, form, and zaplet manipulation, deadlocks in the network 5, generate a URL and content associated with a specific zaplet or form, format the zaplet, message, or form, handle message authorizing, and handle participant record editing and participant interaction with various zaplets, forms, and messages.

A web page formatter 18 is connected to the web application server 14. The web page formatter 18 is used to handle the basic styles and layouts of various components of the zaplets, messages, or forms. Further details of the preferred business logic configured in pseudocode executable by the system and describing the method of the present invention for initiating, sending, updating and displaying the zaplet, forms, and messages can be found in attached Appendix A.

The web page formatter 18 may be configured to operate using a Java Server Page ("JSP") construct.

FIG. 2 also shows that the server 6 includes a mail server 20 coupled to the web application server 14 and the data application server 12. The mail server 20 handles the operations of the e-mail protocol necessary to support a variety of zaplets, forms, and messages. For a given message, form, or zaplet, the mail server 20 retrieves data associated with the medium from the data application server 12, and from any operations of the business logic of the web application server 14. The mail server 20 then formats the static content for the medium utilizing an associated mail formatter 24 including a command to retrieve the dynamic content. The mail formatter 24 includes operations that can be used for the basic styles and layouts of the common elements of the zaplets, forms, or messages. Once the mail server 20 has compiled the required information from the data application server 12 and web application server 14, the mail server 20 may attach necessary header information to the zaplet, form, or message. For example, the header information may make an e-mail message compliant with the MIME standard. The mail server 20 then transmits the produced message to a mail transport server 22. The mail transport server 22 routes the message through the network 5. The mail server 20 may also be configured to manage bounced and undelivered messages, forms, or zaplets, and also alert the appropriate participants of these conditions. The mail server 20 may also communicate with the web application server to validate the addresses of the various participants. The mail server 20 may also receive responses via the interaction region 225 discussed below from any participant who is not connected to the network 10 or "off-line" when reading the zaplet. In this configuration, the participant can send input back to the server 6 to be dynamically updated, after he or she is re-connected to the network 10. In this way, the participant can contribute to a zaplet even in the absence of the dynamic content and without having to get back to the zaplet when connected "on-line".

The mail formatter 24 may be implemented using a JSP construct.

The mail transport server 22 may use SMTP, and can be implemented using a number of commercially available or open source e-mail servers, including Sendmail and the Exchange server.

The server 6 also includes an image server 28 that is used for connection to the participants 1-4. An image formatter 26 is connected to the image server 28. The image server 28 may be implemented using a web server (servlet). The image server 28 takes information from Hypertext Transfer Protocol ("HTTP") requests from the participants 1-4 and translates the information using predefined schemes into human viewable images that are encoded in a format compatible with known web browsers. The image server 28 may be configured separately from the web server 16, as shown in FIG. 2. This configuration may increase the scalability of the server 6. Alternatively, the web server 16 and the image server 28 can be configured together. The image formatter 28 may be configured using a Java construct. The image formatter 28 formats the image into a compliant standard, such as Graphical Interchange Format ("GIF"), Joint Photographics Experts Group ("JPEG"), or Portable Network Graphics ("PNG"), for the participants 1-4.

Figure 3:
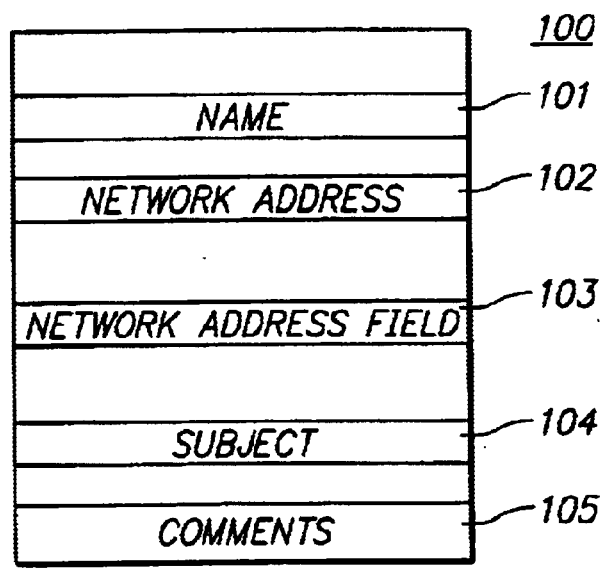
FIG. 3 illustrates an example electronic form to initiate a zaplet.

FIG. 3 illustrates an exemplary electronic form 100 that can be used to compose and initiate a zaplet among the participants 1-4 in accordance with the invention. The electronic form may be, for example, an HTML form. The electronic form 100 can be accessed via a web site sent by the server 6 to the participants 1-4, or may reside as a template at the participants 1-4.

The electronic form 100 can be stored in database 10, reside on a device of a participant, such as in a memory of a computer, or can be sent to a participant via a communications protocol, such as e-mail. The electronic form 100 may be blank or partially completed. To partially complete the form, the server 6 may contain prior knowledge of the use of the form using, for example, "cookies" or other suitable techniques.

The electronic form 100 includes a name field 101 that specifies the creating participant's name and a network address field 102 that specifies a specific address associated with the creating participant, such as an e-mail address. The electronic form 100 can also include a network address field 103 that includes network addresses of the participants that should receive the zaplet. The list of network addresses in the field 103 may include the network address of the creating participant. The list of network addresses may be explicitly inputted by the creating participant using a keyboard, imported from a folder or other file residing at the creating participant, or imported by the creating participant from a peripheral device, such as a Palm Pilot provided by 3Com. Alternatively, the creating participant can provide the list of network addresses to the server 6. In this configuration, the server 6 may input the list of network addresses into the field 103, when the creating participant accesses the electronic form 100, as described below. This means that the field 103 will be completed for the creating participant, when the electronic form 100 is accessed. At this stage, the creating participant may add or delete network addresses from the list provided by the server 6.

The electronic form 100 may also include a subject field 104 and any number of question, choice or comment fields 105. The creating participant may describe the subject matter of the zaplet in the subject filed 104 and supply details regarding the zaplet, in the comment field 105. In one configuration, each of the fields 101, 102, 103, 104, and 105 are part of a static region. The electronic form 100 may also include other applicable fields, such as for a title of the zaplet, fields for soliciting information from the participant, such as his/her address, links to other zaplets, a description field to receive an input, such as a URL, an image or binary data field, or option fields to specify choices, such as a poll choice.

The electronic form 100 can be used to initiate a variety of zaplets for different applications, which are herein referred to as "zaplet processes". Once the electronic form 100 is created, it is sent to the server 6. The server 6 then sends an e-mail message to the participants listed in the network address field 103 to notify the receiving participants that a zaplet process has been initiated. The e-mail message is opened and parsed, and the zaplet is essentially immediately accessed from the server 6 as described below.

Figure 4:
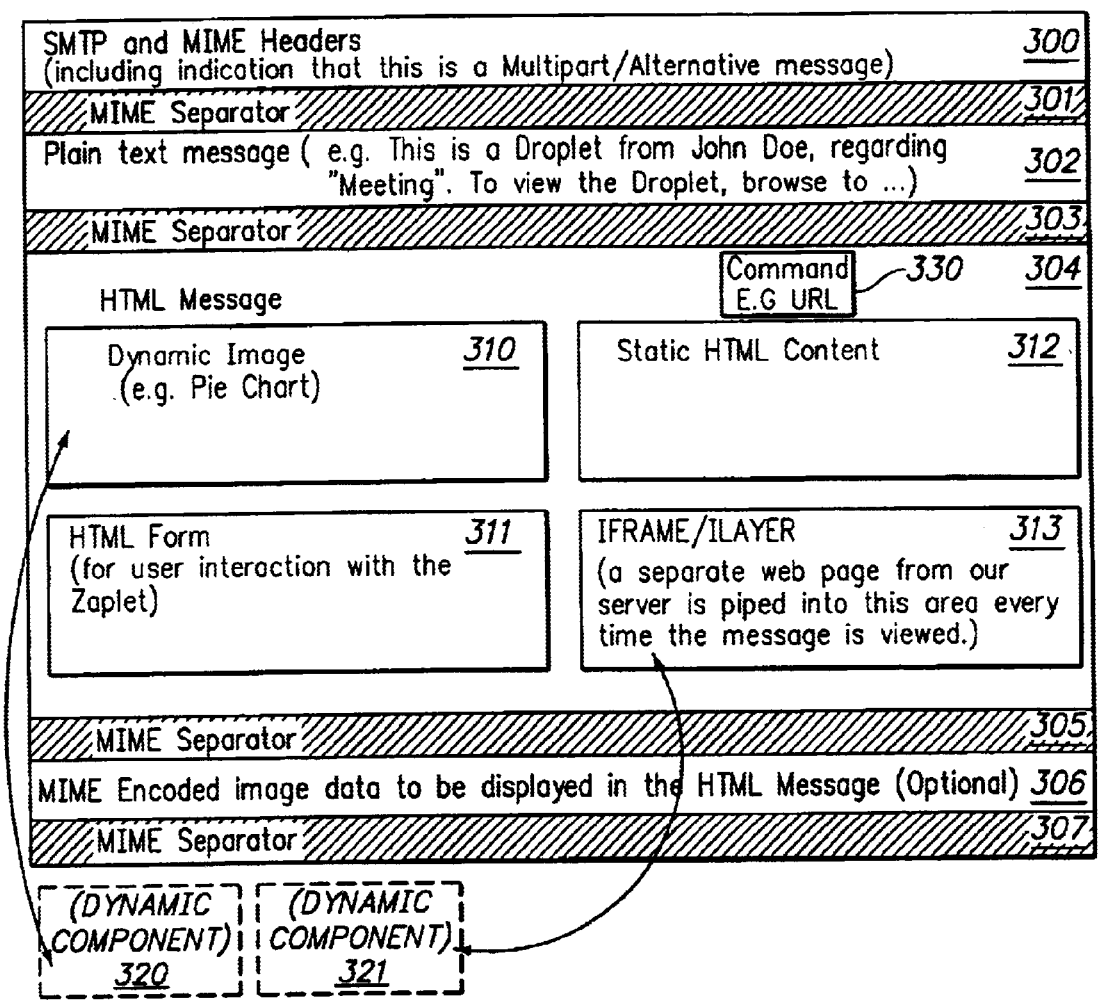
FIG. 4 is a diagram of a data structure for the zaplet having dynamic content.

FIG. 4 shows a suitable data structure for a zaplet process in accordance with the invention.

The data structure 350 can be based, for example, on HTML over SMTP using MIME. The data structure 200 includes SMTP and MIME headers 300. These headers 300 include an indication that the message is a multipart/alternative type according to the MIME standard. The multipart/alternative type specifies that the participant is configured to display one alternative format or content-type of the message selected from a segment 302 and a segment 304, depending on the capability of the software of the participant parsing the message.

The data structure 350 may define a transport envelope with region 300 containing a plurality of network addresses, such as the e-mail address of a sending and receiving participant.

A MIME separator 301 may be inserted between headers 300 and segments 302 and also between segments 302 and 304.

The segment 302 may also include a plain text message that is displayed if the participant does not have the capability to display regions 310 and 313 of segment 304, described below, according to the multipart/alternative message type indicated in the headers 300. For example, the segment 302 can include a command instructing a participant that he or she may view a web page corresponding to the segment 304.

The segment 304 may include a rich text HTML document, including any number of dynamic regions 310, HTML forms 311, static HTML content regions 312, and IFRAME/ILAYER regions 313. The dynamic content region 310 can include a command to dynamic content 320 of the zaplet, stored remotely such as in the database 10 of the server 6 on the network 5. The IFRAME/ILAYER region 313 may include a command to access dynamic content 321 of the zaplet, stored remotely such as in the database 10 or at the server 6 on the network 5. The dynamic content 321 may be in the same location as the first dynamic content 320, or may be in a different location in database 10. Each dynamic content region 310 and 313 may have content that includes more than one dynamically updated construct or image.

The form 311 can be used to receive input from a participant, and the region 312 can be used to provide static information/processes that are independent of the current zaplet process.

The segment 304 may also include a region 330 that can be used to store a command indicating a web page storing the content of the segment 304. This configuration can be used when a participant attempts to forward the zaplet to another participant connected to a server that cannot support the segment 304. In this way, the participant can still view the content of segment 304, and is therefore not dropped from the group.

In FIG. 4, a MIME separator 305 is configured between the segment 304 and a segment 306.

The segment 306 can include MIME encoded image data to be displayed in the HTML message of segment 304. The image data may include images for logos or photos that can be accessed by the participant even if the server 6 is not accessible. The optional segment 306 is followed by a MIME separator 307.

The present inventors have discovered that the structure 350 can be used to provide a high quality of service to various classes of participants based upon their e-mail client application capabilities. Five classes of "e-mail clients" include new P.C. e-mail clients, web e-mail clients, older P.C. e-mail clients, text e-mail clients, and America On-Line ("AOL") e-mail clients. The functionality in the segment 304 is provided to new P.C. e-mail clients completely. Some web e-mail clients do not allow use of an IFRAME/ILAYER tag to display dynamic content 321 of the dynamic content region 313. In this case, the participant gets a static message directing the participant to a web representation, or a dynamic image displaying the same up-to-date data is served by the image server 28. Many older P.C. e-mail clients, and all of the text e-mail clients cannot display the segment 304. These participants may receive an e-mail message with static content, and a URL identifying a web page at which the dynamic content may be accessed. Current AOL clients support some of the HTML standard.

It has also been found that the server 6 can be configured to identify the capability of a participant. For example, the server 6 can be configured to automatically send the zaplet to the participant by recognizing the suffix "aol.com" in the participant's network address. Alternatively, the participant can specify which e-mail client to use by sending a request to the server 6.

Figure 5:
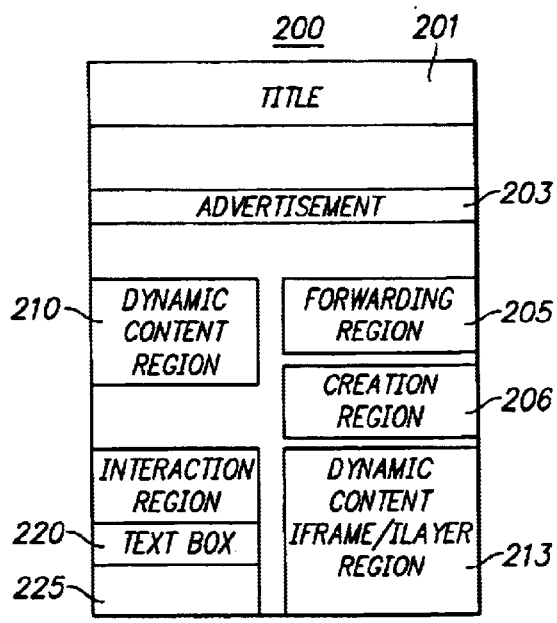
FIG. 5 is an example of an image of a zaplet.

FIG. 5 shows an example of an image of a zaplet 200 that is displayed to a user when the data structure 350 is parsed. The zaplet may include a title field 201 that contains static content similar to the information inputted in fields 101, 102, 104, and 105. Preferably, the above static content is displayed each time the zaplet 200 is accessed by a participant. The zaplet 200 may also include an advertising region 203. The content in region 203 can be static or dynamic content. The content in regions 201 and 203 can be configured and supplied by the business logic in web application server 14.

The zaplet 200 also includes a forwarding region 205 and a creation region 206 corresponding to segment 312 of the data structure 350. The region 205 allows a participant to add an address of a potential participant that is not listed in the address field 103. This means that any participant listed in the address list of field 103 can include any other potential participants not listed in the field 103. In other configurations, the ability of a participant to add another participant can be controlled by the creating participant of the zaplet.

The creation region 206 is also included in zaplet 200 to allow a participant to create an electronic form similar to electronic form 100 to initiate another zaplet process. p The zaplet 200 also includes a dynamic content region 210 corresponding to segment 310 of data structure 350 that receives the dynamic content 320. In one configuration, region 210 may include a graphical image, such as a pie chart, or other binary content including executable content. The content 320 of the region 210 can be dynamically updated by the business logic residing in the web application server 14.

The zaplet 200 also includes an interaction region 225 corresponding to segment 312 of the data structure 350. The interaction region can include images, such as check boxes, to select options created using the electronic form 100. For example, a poll can be initiated in electronic form 100 and the interaction region 225 could contain boxes to select a poll choice. The interaction region also contains a text box 223 that allows a participant to add a text passage to the zaplet. The interaction region may also include the name of the responding participant and his or her associated e-mail address.

A dynamic content region 213 corresponding to region 313 of data structure 350 is contained in zaplet 200 that receives the content 321. The content 321 can include text passages that are entered by participants using the interaction region 225. The business logic at the web application server 14 manages the text passages and causes changes to the variables in database 10 to update the content 321 and to display the updated content in region 213, when the participant opens the message. The displayed content in region 213 may include visual images, a list of participants who have entered text passages, or any other relevant dynamic content.

Figure 6:
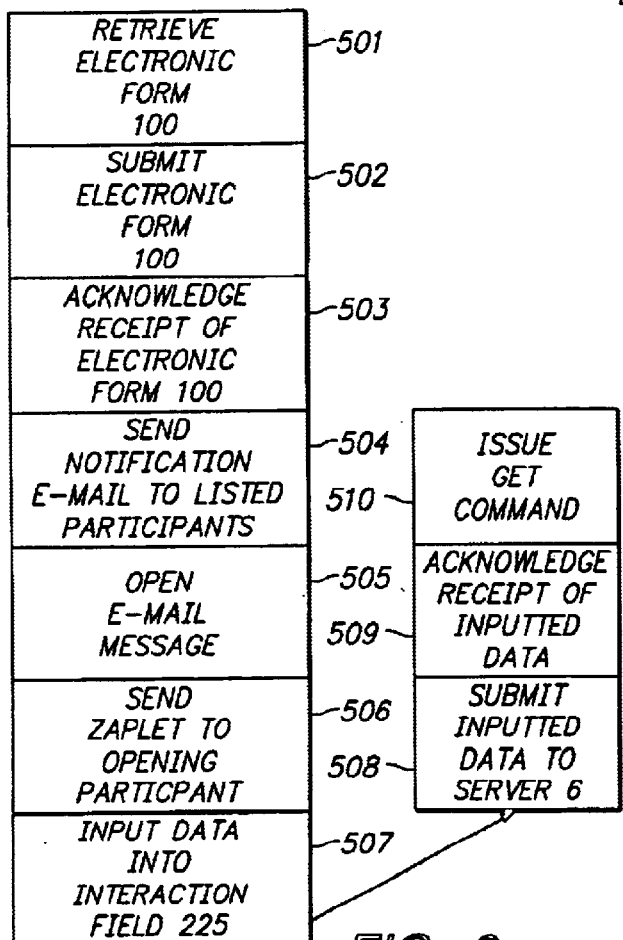
FIG. 6 is a flow chart illustrating a preferred method of the present invention.

FIG. 6 is a flow chart of a preferred method of the invention. Initially, one of the participants accesses a live electronic form 100 to begin a zaplet process (step 501). The requesting participant may access the form 100 from the database 10 via the web server 16, from a web site, or other resource as discussed above. To access the electronic form 100, the participant may specify a descriptor, such as a URL, associated with the electronic form 100. Once the electronic form 100 is displayed to the participant, the participant completes the fields 101, 102, 103, and 104. The participant may also complete field 105. The participant then submits the form to the server 6 (step 502).

Next, a confirmation message is sent from the web server 16 indicating that the content of the electronic form 100 was received, that the electronic form 100 was sent to the addresses listed in field 103, and any other errors associated with the processing of the electronic form 100 (step 503). Alternatively, the creating participant of the electronic form 100 may receive the e-mail message (step 504) described below as an acknowledgement that the form 100 was successfully received by the server 6.

Each of the participants in the list in field 103 receives an e-mail message associated with the zaplet (step 504) indicating that the zaplet process has been initiated. Next, a receiving participant opens the message (step 505). In one configuration, a receiving participant may be the creating participant. This mechanism could allow a creating participant to create a "personal" zaplet that only he or she could update or retrieve. Once the receiving participant opens the e-mail message, the dynamic content of the zaplet 200 is served essentially at viewing time to the display of the participant as follows (step 506).

Figure 7:
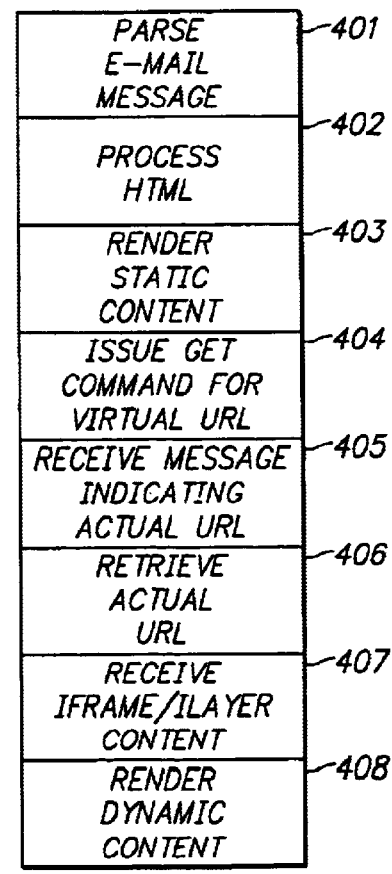
FIG. 7 is a flow chart illustrating a preferred method of accessing the zaplet by parsing the data structure of FIG. 4.

Referring to FIG. 7, the e-mail protocol residing at the participant begins by parsing the received e-mail according to the MIME and SMTP header and separators 300 (step 401). If the participant is capable of displaying the dynamic content of the zaplet in the segment 304, content is produced by parsing the HTML (step 402). The participant initially renders static components of the zaplet, such as in the regions 311 and 312 (step 403). To render the dynamic content in region 310, a parsing engine at the participant issues a get command using, for example, a virtual URL identified by a tag field in the HTML (step 404). The server 6 includes logic, such as business logic in web application server 14, to map the virtual URL to an actual URL for the dynamic content 320 of the dynamic content region 310, and returns a message indicating the actual URL for the dynamic content 320 corresponding to the virtual URL, which is received at the participant site (step 405). A get command for the actual URL is then issued (step 406). A web page indicated by the IFRAME/ILAYER region 313 of the data structure 350 can also be retrieved similar to steps 404–406 (step 407), and then the dynamic content 321 for the dynamic content region 313 is rendered (step 408).

Referring again to FIG. 6, once the zaplet 200 is retrieved by the participant, he or she inputs data into the interaction region 225 (step 507). For example, the user may input a text passage. At this stage, the dynamic content region 213 will include concatenated text messages and a list of message recipients as discussed above. The participant then submits the updated zaplet to the server 6 (step 508). Next, the submitting participant receives an acknowledgement from the web server 16 indicating that the zaplet was received (step 509). The e-mail protocol residing at the client may then issue at any time a new get command for the dynamic content in region 310 and/or region 313 to display the updated images and/or text content in the dynamic content regions 210 and 213 (step 510). Alternatively, after the participant submits his or her input (step 508), another instance of the zaplet could be served that includes the above acknowledgement, and also reflects the most recent dynamic content including the submission at step 508. In another configuration, the dynamic content of the zaplet could be updated "in-place". This means that the regions 210 and 213 could be updated to reflect the most recent content in the server 6 including the submission at step 508, as the participant is viewing the zaplet. Subsequent actions by any of the participants of the group to open a message will result in the display of the updated images and text content in the zaplet 200.

The preferred method permits participants to collaborate efficiently. Each participant can send and receive information that is current using dynamic regions 210 and 213. This means that participants can accurately respond or opine to a zaplet process with the most current information at their disposal.

The preferred method supports privacy and communications because the dynamic content can be restricted to those specified in field 103. Further, the preferred method and system allows content to be dynamically updated asynchronously relative to the sending of the documents or forms and asynchronously relative to any processes used by any other participants parsing the electronic messages. In this way, the zaplets received by participants of the group do not become stale or outdated. Additionally, the updated content includes dynamic information identifying changes that have occurred since the message was last viewed by the viewing participant. This means that the viewing participant can track the opinions, suggestions, or other comments made by other participants in a simple and quick manner. The preferred method also allows participants to interact with other participants in a group without the daunting task of "surfing" the Web to find the discussion management tool that manages the discussion. The preferred method and system also provides the highest quality service based upon the participant's e-mail application capabilities.

The above preferred methods and systems can be used to support process interaction among a group of participants. A process may be defined as a system that has one or more states through which there are one or more steps necessary to move from one state to the next. A state can be an initial (starting), intermediate, or terminal (finish). A step may have zero or more participants. In a preferred configuration, participants may be people, rules sets, automated agents, or services. The above preferred systems and methods may be used to enable participants to interact within a specific process. These processes may include a discussion, tracking, purchase, collection, approvals, or negotiations. A discussion can be defined as the exploration of some topic, series of topics, or sub topics. Tracking can be defined as a log of states through which a package, trouble ticket, customer support case, or the like has passed. Purchase can be defined as a sequence of states through which a decision process proceeds before a completed purchase. A collection may be defined as the collection of money or other commitments from other participants. An approval may be defined as a collection of approvals from possible multiple participants. The order for the collection of approvals may be predetermined. A negotiation may be defined as an auction, feedback collection and issue resolution, or a "haggling" tool.

Figure 8:
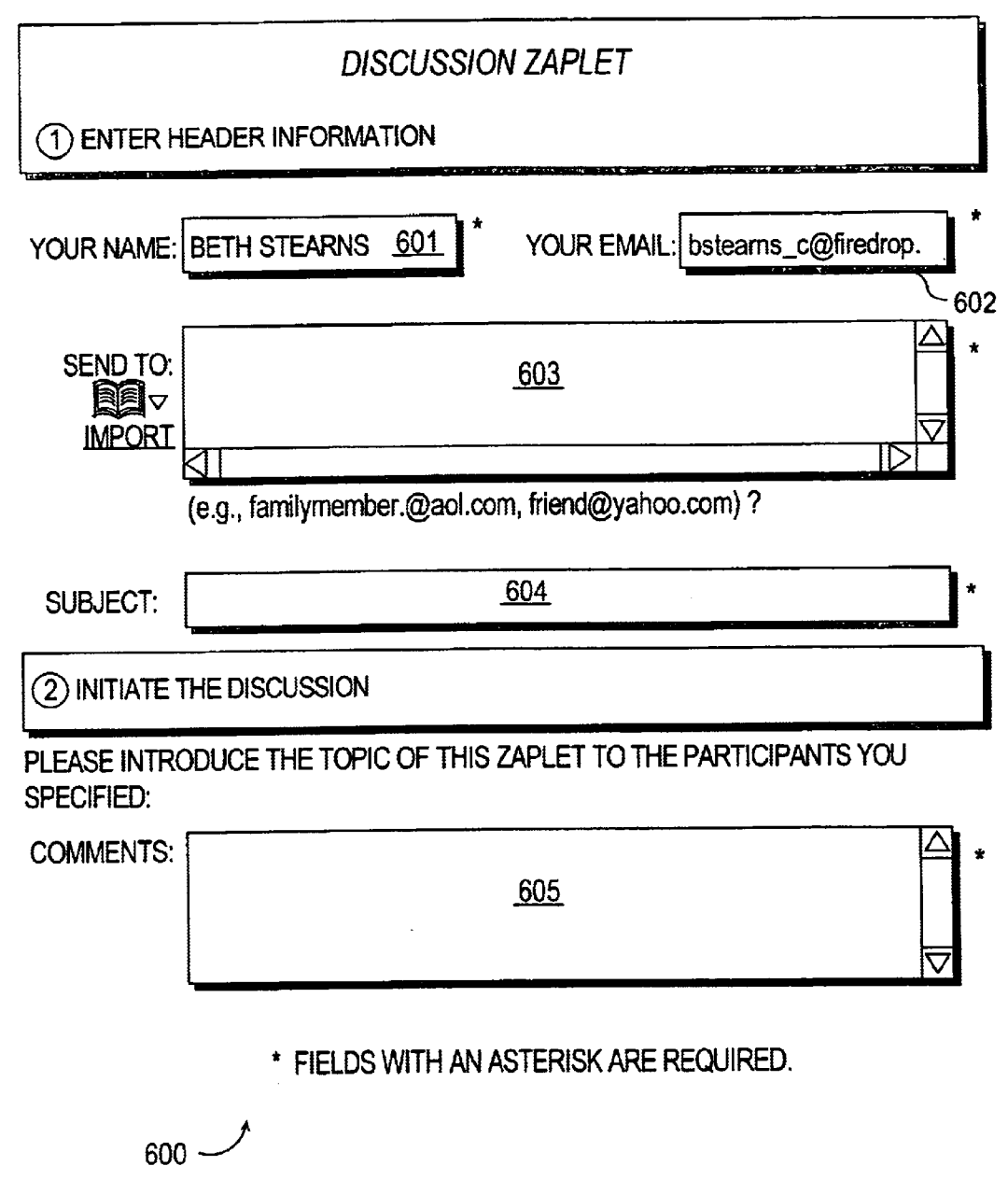

An example of a discussion in accordance with the preferred systems and methods is as follows. A discussion is composed of an initial discussion topic (series of topics, or group of sub topics) and the comments of participants. The process is the exploration of the topic. The addition, modification, or deletion of a comment represents a new state in the discussion process. Discussions can be single or multi-threaded. Initially, one of the participants accesses a live electronic form 600 (FIG. 8) by executing step 501. The initiating participant may access the form 600 similar to the form 100 described above. As shown in FIG. 8, the electronic form 600 may include fields 601, 602, and 603. The initiating participant's name may be inserted into the field 601, the network address of the initiating participant may be included in the field 602, and a list of participants may be entered into the field 603 similar to the field 103 described above.

The electronic form 600 may also include a subject field 604 that includes a title of the discussion, and a field 605. The field 605 may be used to fully specify the topic of the discussion and add any preliminary or initial comments from the initiating participant. Once the initiating participant has completed the electronic form 600, the form 600 is submitted to the server 6 in the step 502. The steps 503, 504, 505, and 506 are then executed.

The e-mail protocol residing at the participant then executes steps 401–408.

After step 408 is executed, a zaplet 700 is displayed to an accessing participant. The zaplet 700 may include a banner 701 that includes the name of the initiating participant and the time and date when the electronic form 600 was created. In this example, the authoring participant is "Beth Stearns" and the time and date are "Thursday, Dec. 2, 1999 2:55:30 PM P.S.T." The banner may also include other information relevant to the zaplet. The zaplet 700 may also include an entry 725 that corresponds to the information entered into the field 605 of the electronic form 600.

The zaplet 700 may also include an interaction region 715 having fields 702, 703, and 704. The field 702 is used to accept input from a participant concerning the discussion. The fields 703 and 704 may be used to receive the name of the responding participant and a network address, respectively. Once data is inputted into the interaction region 715 at step 507, the participant may then submit the zaplet 700 to the server 6 at step 508 using a button 706. A button 707 may be used to reset the contents of the fields 702, 703, or 704 before the input is submitted to the server 6. In certain embodiments, the interaction region 715 may be displayed outside of the zaplet 700. For example, the interaction region 715 may be included in another image displayed to the participants.

The zaplet 700 may also include a dynamic content region 709. The dynamic content region 709 is used to display text inputted by any of the participants via the interaction region 715 in a current form. This means that the content in the dynamic content region 709 is always current when the zaplet is retrieved or accessed by any of the participants. In a preferred configuration, the text input entered into the interaction region 715 is concatenated using the business logic, as described above. Further, the dynamic content region may also include graphics, buttons, and links that are concatenated similar to the text described above. The buttons and links can be used to modify and delete individual comments.

The zaplet 700 may also include a forwarding region 720. The forwarding region 720 may be used to add more people to the group of participants listed in the field 603. To add more participants, the zaplet may be forwarded by clicking on the button 721. The forwarding region 720 may be displayed outside of the zaplet 700. For example, the forwarding region may be displayed as a separate image to the participant.

FIG. 10 shows an updated image of the zaplet 700. The dynamic content region 709 includes the concatenated text corresponding to the input entered by a participant in the field 702 of the interaction region 715. The participant's name and the time and date of the input may also be shown in the dynamic content region 709. In this example, the participant is "Beth Stearns," the input is sent to the server 6 on "Dec. 2, 1999, 3:04:08 PM PST," and the text input is "I'm sure I'll have lots to say right after the debate ends." Subsequent text input by the same or other participants in the group may be displayed in the same manner. In this way, a participant who accesses the zaplet, such as by clicking on an electronic mail message in his or her in box, is able to view an aggregated list of responses before responding to the discussion. Further, a participant can also determine how his or her input has effected the discussion.

In another example, the zaplet may be used to send or track packages between the participants. In one configuration, an initiating participant may access a live electronic form 800 (FIG. 11) by executing the step 501. The initiating participant may access the form 800 similar to the form 100 described above. As shown in FIG. 11, the electronic form 800 may include fields 801, 802, and 803. The initiating participant's name may be inserted into the field 801, the network address of the initiating participant may be included in the field 802, and an address of the participant receiving the package may be inserted into the field 803. The electronic form 800 may also include a field 804 and a field 805. The field 804 may be used to identify a specific package, for example, by using a tracking number. The field 805 may be used to add additional comments relevant to the package being tracked. In other configurations, the electronic form 800 may be optional. In this case, to begin a tracking process, a zaplet 900 (FIG. 12) may be automatically sent to a participant sending a package, as described below.

Once the initiating participant has completed the electronic form 800, the form 800 is submitted to the server 6 in the step 502. The steps 503, 504, 505, and 506 are then executed.

The e-mail protocol residing at the participant then executes steps 401–408.

After step 408 is executed, a zaplet 900 is displayed to an accessing participant. The zaplet 900 may include a tracking information region 901. The information in region 901 may be entered by a package tracking system in data communication with the server 6. In this example, the information includes the tracking number, the service type, the weight of the package, the day of shipment, and the destination of the package. The information region 901 may also include the information entered into the fields 801, 802, 803, and 805 from the electronic form 800.

The zaplet 900 may also include an interaction region 915 similar to the interaction region 715 described above and having fields 902, 903, and 904. The fields 902, 903, and 904 are similar to the fields 702, 703, and 704 described above. Once data is inputted into the interaction region 915 at step 507, the participant may then submit the zaplet 900 to the server 6 at step 508 using a button 906. A button 907 may be used to reset the contents of the fields 902, 903, and 904.

The zaplet 900 may also include dynamic content regions 908 and 909. The content in the dynamic region 908 may be dynamically updated by the tracking system as the package moves through the process of delivery. In this way, a participant can view the original zaplet 900 and locate where the package is in the entire process.

The dynamic content region 909 is similar to the dynamic content region 709 described above. The dynamic content region 909 can be used to dynamically update the text input entered into the interaction region 915 as different participants receive the package.

FIG. 13 illustrates an updated image of the zaplet 900. The dynamic content region 908 includes multiple entries describing the activity of the package during the delivery process. In this example, the dynamic content region 908 may include information relevant to the location of the package and the origination and arrival of the package. FIG. 13 also shows that the dynamic content region 909 includes updated entries from the participants receiving the package. For example, the dynamic content region 909 can include comments from the participants indicating that the package arrived.

In other configurations, the interaction region 915 can be used to communicate with a company handling or shipping the package. For example, an entry into the interaction region 915 may trigger a customer support response from the shipping company that can be used to resolve problems, such as lost packages. In other configurations, the zaplet 900 may be used for workflow progress tracking and customer support tracking.

The zaplet may also be used in a process of group purchase and money collection collaboration. For example, the zaplet may be used to allow a group of individuals to collaborate to purchase tickets to an event. By purchasing the tickets collectively, the number of tickets, and the location of tickets can be agreed upon by all of the participants attending the event. Further, the zaplet can be used to collect payment information before the tickets are purchased.

FIG. 14 illustrates a live electronic form 1000 that is initially accessed by a participant by executing the step 501. The initiating participant may access the form 1000 similar to the form 100 described above. As shown in FIG. 14, the electronic form 1000 may include fields 1001, 1002, 1003, 1004, 1005, and 1006. The fields 1001, 1002, 1003, and 1004 are similar to the fields 601, 602, 603, and 604 described above. The fields 1005 and 1006 may be used to further specify the event and add any preliminary or initial comments from the initiating participant.

The electronic form 1000 may also include a region 1007 that includes information about the event. For example, the region 1007 may include the location or address of the event, the type of event, the date and time of the event, the price per ticket, the number of tickets, the total price for the event, and other similar fields.

Once the initiating participant has completed the electronic form 1000, the form 1000 is submitted to the server 6 in the step 502. The steps 503, 504, 505, and 506 are then executed.

The e-mail protocol residing at the participant then executes steps 401–408. After step 408 is executed, a zaplet 1100 is displayed to an accessing participant. The zaplet 1100 may include an information region 1101. The information region 1101 may include information from the region 1007 and information entered the fields 1001, 1002, 1004, 1005, and 1006. In this example, the location, the date and time, the price per ticket, the number of available tickets, and comments about the event are included in the region 1101. The zaplet 1100 may also include an interaction region 1115 similar to the interaction region 915 described above and having fields 1102, 1103, 1104, 1105, 1106, and 1107. The fields 1102, 1103, 1104, 1106, and 1107 are similar to the fields 702, 703, 704, 706, and 707 described above. The field 1105 can be used to quickly determine if one of the participants is available to attend the event. This field may include buttons corresponding to "yes" and "no."

The zaplet 1100 may include a dynamic content region 1109. The dynamic content region 1109 is similar to the dynamic content region 709.

One benefit to the zaplet 1100 is a payment region 1110. The payment region 1110 may be used to accept billing information or credit card information from the participant to collect payment information for a ticket being purchased. In this way, the initiating participant can ensure that the ticket or tickets can be purchased. The information from the region 1110 may be authorized and stored in the server 6.

FIG. 16 illustrates an updated image of the zaplet 1100. As shown in FIG. 16, the input from the interaction region 1115 is concatenated using business logic, as described above. This means that the participant purchasing the tickets can determine, for example, who is attending the event.

The preferred zaplet may also be used as an approval process tool. The zaplet can be used to generate a process of approval in which multiple individuals within an enterprise environment must approve or disallow, for example, a purchase order requisition submitted by a potential purchaser.

Initially, one of the participants accesses a live electronic form 1200 (FIG. 17) by executing the step 501. The initiating participant may access the form 1200 similar to the form 100 described above. As shown in FIG. 17, the electronic form 1200 may include fields 1201, 1202, 1203, and 1205. The fields 1201, 1202, 1203, and 1205 are similar to the 601, 602, 603, and 605 described above. The electronic form 1200 may also include an identification field 1204 to receive, for example, a purchase order number.

A region 1206 may be used to describe information relevant to the purchase order. For example, the region 1206 may include the invoice amount, the payment due date, the approval due date, the purchase description, the quantity, the list price, and the potential buyer and seller information. The form 1200 may be completed by an initiating participant or automatically generated by a company's purchasing software that is in data communication with the server 6.

The electronic form 1200 also includes an approval region 1207. This region lists all participants or individuals within a company who must approve the purchase order. Once the initiating participant has completed the electronic form 1200, the form 1200 is submitted to the server 6 in the step 502. The steps 503, 504, 505, and 506 are then executed.

The e-mail protocol residing at the participant then executes steps 401–408. After step 408 is executed, a zaplet 1300 is then displayed to an accessing participant. The zaplet 1300 may include an information region 1301. The information region 1301 may include information from the region 1206, the fields 1201, 1202, 1204, and 1205. In this way, a participant who must approve the purchase order can view specific details about the purchase.

The zaplet 1300 may also include an interaction region 1315 similar to the interaction region 915 described above and having fields 1302, 1303, and 1304. The fields 1302, 1303, and 1304 are similar to the fields 702, 703, and 704 described above.

The zaplet 1300 may also include a dynamic content region 1310. The dynamic content region may include a list of participants required to approve the purchase order and buttons that can be selected to approve or disapprove the purchase order.

FIG. 19 shows an updated image of the zaplet 1300. As shown in FIG. 19, the dynamic content region 1310 is updated with approvals or disapprovals from the individuals who must be notified of the purchase order before approval is given to the initiating participant. In a preferred configuration, the approval zaplet is distributed and follows a defined sequential or hierarchical path. This means that a participant who must approve the transaction at one level, for example, an initiating participant's direct manager, must first approve the purchase order request before the zaplet 1300 is passed to the next approval level, such as a participant in the accounting department. The zaplet, in turn, may then be passed to the next higher approval level. In some configurations, a participant who receives the purchase order approval zaplet for approval may only receive the zaplet if those participants at the lower levels of the hierarchical path have approved the purchase order. Preferably, a participant who receives the zaplet can view the approval or disapproval of the purchase order using the dynamic content region 1310. In one configuration, if a disapproval is received, the approval process may be terminated and the request can be marked disallowed and returned to the initiating participant.

In another example, the zaplet can be used for a process of negotiation. For example, the zaplet may be implemented as an auction monitoring and bidding zaplet. In this configuration, the auction may involve buyers bidding up for single products. In another configuration, the auction is reversed in that multiple people are bidding on one or more products in an effort to secure a high volume discount price. In another configuration, the auction can price drop as a time deadline approaches, i.e., a "Dutch" auction. A participant can bid anytime as long as items remain for sale. However, all the items may be sold before the time deadline. The auction may also include participants placing one or more bids on a product and their bid being accepted or denied. In other configurations, the negotiation may be a request for proposal that has feedback collection and issue resolution, a price haggling interaction, a gaming odds setting tool, a bidding process, a contract terms setting tool, a plea bargaining mechanism, a securities trading aid, or any other structured or unstructured negotiation.

Referring to FIG. 20, the initiating participant initially accesses a live electronic form 1400 similar to the electronic form 100 described above. The electronic form 1400 may include fields 1401, 1402, 1403, 1404, and 1405. The fields 1401, 1402, and 1403 are similar to the fields 601, 602, and 603 described above. The field 1404 may be used to list an auction site, such as an Internet address. The field 1405 may be used to identify an auction item, for example, by auction item number. Once the initiating participant has completed the electronic form 1400, the form 1400 is submitted to the server 6 in the step 502. The steps 503, 504, 505, and 506 are then executed.

The e-mail protocol residing at the participant then executes steps 401–408.

After step 408 is executed, a zaplet 1500 is then displayed to an accessing participant. The zaplet 1500 may include a field 1501 and a field 1504. The field 1501 may include information corresponding to the fields 1401, 1402, 1404, and 1405.

The zaplet 1500 may also include an interaction region 1515 similar to the interaction region 915 described above and having fields 1522, 1523, 1524, 1526, 1527, 1528, and 1529. The fields 1522, 1523, 1524, 1526, and 1527 are similar to the fields 702, 703, 704, 706, and 707 described above. The fields 1528 and 1529 may be used to enable a participant to place a bid to buy the auctioned item.

The zaplet 1500 may also include dynamic content regions 1502, 1503, and 1506. The dynamic region 1502 may include information about the bid history for the auction item. For example, the bid history may include the name of the bidder, a comment from a bidder, the bid amount, and the quantity. The dynamic region 1503 may include information about the auction. The information in the region 1503 may include the current bid, the time left for bidding, the number of bids, and the closing date of the auction. This information may be updated, for example, by the server 6. The dynamic content region 1506 is similar to the region 709 described above.

FIG. 22 illustrates an updated view of the zaplet 1500. As shown in FIG. 22, the dynamic content regions 1502, 1503, and 1506 can be updated with the bid history, the auction information, and any comments received via the interaction region 1515, respectively. In this way, the auction zaplet can be used to allow a participant to monitor the bidding on a particular auction item and view information about the bids before making his or her own bid. Further, the auction zaplet can be used to monitor the bids from potential buying participants. In this way, if a minimum bid amount has been specified, then bids may only be accepted if that bid is greater than the minimum specified amount. Further, a bid from a participant may not be accepted if it is less than the current bid amount indicated in the dynamic content region 1503. Thus, frivolous or unwanted bids can be avoided.

The preferred process interaction tool is simple and allows participants access to an aggregated state of the process interaction when they access the zaplet. This is because the information in the dynamic content regions (e.g., 709) is current when accessed by any of the participants using the preferred methods and systems described above. Further, the preferred process interaction tools do not require a proprietary-client system. This is because the zaplet process utilizes MIME, SMTP, HTTP, and HTML technologies. Also, the participant is immediately provided with the result of his or her contribution to the process interaction. Moreover, the preferred process interaction tools can support large numbers of participants in a group, and provides the look and feel of live interaction by supplying the most current information to the participant once the zaplet is accessed. Yet, the participant is not burdened by having to be present in a real time conferencing environment. This allows the participant to calmly prepare and contemplate his or her response. Additionally, the dynamic content region can be used to simply and easily indicate that the process interaction has terminated. This means that the participant will not unnecessarily contribute to the process interaction.

The methods and mechanisms described here are not limited to any particular hardware or software configuration, or to any particular communications modality, but rather they may find applicability in any communications or computer network environment.

The techniques described here may be implemented in hardware or software, or a combination of the two. Preferably, the techniques are implemented in computer programs executing one or more programmable computers that each includes a processor, a storage medium readable by the processor (including volatile and non-volatile memory and/or storage elements), and suitable input and output devices. The programmable computers may be either general-purpose computers or special-purpose, embedded systems. In either case, program code is applied to data entered with or received from an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk, magnetic diskette, or memory chip) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

A number of embodiments of the present invention have been described. Nevertheless, it will be understood that various modifications may be made without departing from the spirit and scope of the invention. For example, variations in the specification of which e-mail protocol a particular participant supports can be sent by the participant to the server 6 so that a different message format based on that knowledge can be forwarded to the participant. Accordingly, other embodiments are within the scope of the following claims.

What is claimed is:

1. An apparatus for facilitating a process interaction among participants in a group, comprising:

a data store comprising one or more stored electronic media, each electronic medium having dynamic content associated therewith and stored in the data store, each electronic medium comprising one or more process interaction elements;

a processor that is communicatively coupled to the data store;

a memory that is communicatively coupled to the data store and comprising one or more sequences of instructions which, when executed by the processor, cause the processor to carry out the steps of:

generating and sending a first electronic message to one or more selected participants among the group, wherein the first electronic message is associated with a first electronic medium in the data store by one or more dynamic content elements in the first electronic message;

asynchronously receiving, from one or more of the selected participants, one or more information updates relating to the process interaction elements of the first electronic medium;

dynamically updating the dynamic content of the first electronic medium based on the one or more information updates;

receiving information specifying a first open action from a first participant among the selected participants who has received the first electronic message; and serving the dynamic content, including all then-current updates thereto, to the first participant in response to the first open action;

the apparatus further comprising one or more templates stored in the data store, wherein each of the templates defines a format of one of the electronic media; and instructions in the memory which, when executed by the processor, cause the processor to carry out the steps of:

retrieving a first template from the data store;

receiving user input providing one or more network addresses of recipients and one or more dynamic content items for association with the first template;

creating and storing a second electronic medium in the data store based on the first template and the user input; and sending a second electronic message to each of the recipients, wherein the second electronic message references the second electronic medium.

2. An apparatus as recited in claim 1, wherein the first electronic message comprises a name field that identifies network addresses of the selected participants; a subject field that identifies a subject of the electronic medium; a plurality of static content elements; and a plurality of dynamic content elements that reference dynamic content of the electronic medium.

3. An apparatus for facilitating a process interaction among participants in a group, comprising:

a data store comprising one or more stored electronic media, each electronic medium having dynamic content associated therewith and stored in the data store, each electronic medium comprising one or more process interaction elements;

a processor that is communicatively coupled to the data store;

a memory that is communicatively coupled to the data store and comprising one or more sequences of instructions that, when executed by the processor, cause the processor to carry out the steps of:

generating and sending a first electronic message to one or more selected participants among the group, wherein the first electronic message is associated with a first electronic medium in the data store by one or more dynamic content elements in the first electronic message;

asynchronously receiving from one or more of the selected participants, one or more information updates relating to the process interaction elements of the first electronic medium;

dynamically updating the dynamic content of the first electronic medium based on the one or more information updates;

receiving information specifying a first open action from a first participant among the selected participants who has received the first electronic message; and serving the dynamic content, including all then-current updates thereto, to the first participant in response to the first open action;

a template stored in the data store, wherein the template defines a format of the first electronic medium and comprises one or more data fields; and a cookie stored in a computer system external to the data store, wherein the cookie defines one or more data values of fields in the template that automatically partially complete the template.

4. An apparatus as recited in claim 3, wherein the first electronic message further comprises one or more headers, wherein one or more of the headers specifies the first electronic message as a multipart/alternative type, and further comprising instructions in the memory that, when executed by the one or more processors, cause the one or more processors to carry out the steps of:

parsing the headers;

selecting one message format from among a plurality of message formats specified by the multipart/alternative type in the header that a participant is configured to display;

displaying the first electronic message according to the selected message format.

5. An apparatus as recited in claims 3, wherein the steps of generating, sending, receiving, updating, and serving are carried out using SNMP requests and responses.

6. An apparatus as recited in claim 3, wherein the process interaction comprises a process interaction selected from among the set consisting of discussion, tracking, purchase, collection, approval, and negotiation.

7. An apparatus as recited in claim 3, wherein the dynamic content comprises a plurality of sets of text corresponding to the one or more information updates.

8. An apparatus as recited in claim 3, wherein the sequences of instructions further comprise instructions that, when executed by the processor, cause the processor to carry out the steps of generating, as part of the electronic medium, a tag associated with a universal resource locator that identifies a location of the dynamic content.

9. An apparatus as recited in claim 3, wherein the sequences of instructions further comprise instructions that, when executed by the processor, cause the processor to carry out the steps of:

asynchronously receiving one or more second information updates from a data source that is external to the data store and the processor;

dynamically updating the dynamic content of the first electronic medium based on the one or more second information updates.

10. An apparatus as recited in claim 3, wherein each electronic message further comprises one or more static content regions that define associated static content stored in the data store.

11. An apparatus as recited in claim 3, wherein the step of receiving information specifying a first open action from a first participant among the selected participants comprises the step of receiving a request from an electronic mail client application program requesting to open the first electronic message.

12. An apparatus as recited in claim 3, wherein the first electronic message comprises one or more instructions in hypertext markup language (HTML).

13. An apparatus as recited in claim 12, wherein each of the dynamic content regions is defined by an IFRAME HTML tag or an ILAYER HTML tag.

14. An apparatus as recited in claim 3, wherein the first electronic message comprises one or more instructions in Extensible Mark-up Language (XML).

15. An apparatus as recited in claim 3, wherein the first electronic message comprises one or more instructions in Standard Generalized Mark-up Language (SGML).

16. An apparatus as recited in claim 3, wherein the first electronic message comprises a transport envelope, a plurality of static content regions; a plurality of dynamic content regions that reference dynamic content of the electronic medium; and a plurality of MIME elements that delimit the static content regions and dynamic content regions.

17. An apparatus for facilitating a process interaction among participants in a group, comprising:

a data store comprising one or more stored electronic media, each electronic medium having dynamic content associated therewith and stored in the data store, each electronic medium comprising one or more process interaction elements;

a processor that is communicatively coupled to the data store;

a memory that is communicatively coupled to the data store and comprising one or more sequences of instructions that, when executed by the processor, cause the processor to carry out the steps of:
  generating and sending a first electronic message to one or more selected participants among the group, wherein the first electronic message is associated with a first electronic medium in the data store by one or more dynamic content elements in the first electronic message;
  asynchronously receiving, from one or more of the selected participants, one or more information updates relating to the process interaction elements of the first electronic medium;
  dynamically updating the dynamic content of the first electronic medium based on the one or more information updates;
  receiving information specifying a first open action from a first participant among the selected participants who has received the first electronic message; and
  serving the dynamic content, including all then-current updates thereto, to the first participant in response to the first open action; and
the apparatus further comprising an electronic form stored in the data store, wherein the electronic form defines a format of the first electronic medium and comprises a name field, a network address filed that includes network addresses of participants who will receive dynamic content from an electronic medium based on the electronic form, a subject field, and one or more question, choice, or comment fields.

18. An apparatus as recited in claim 17, further comprising a cookie stored in a computer system external to the data store, wherein the cookie defines one or more data values of fields in the electronic form that automatically partially complete the electronic form.

19. An apparatus as recited in claim 18, further comprising instructions in the memory which, when executed by the processor, cause the processor to carry out the steps of:
  retrieving the electronic form from the data store;
  receiving user input providing one or more network addresses of recipients and one or more dynamic content items for association with the electronic form;
  creating and storing a second electronic medium in the data store based on the electronic form and the user input; and
  sending a second electronic message to each of the recipients, wherein the second electronic message references the second electronic medium.

20. An apparatus for facilitating a process interaction among participants in a group, comprising:
  a data store comprising one or more stored electronic media, each electronic medium having dynamic content associated therewith and stored in the data store, each electronic medium comprising one or more process interaction elements;
  a processor that is communicatively coupled to the data store;
  a memory that is communicatively coupled to the data store and comprising one or more sequences of instructions that, when executed by the processor, cause the processor to carry out the steps of:
    generating and sending a first electronic message to one or more selected participants among the group, wherein the first electronic message is associated with a first electronic medium in the data store by one or more dynamic content elements in the first electronic message;
    asynchronously receiving, from one or more of the selected participants, one or more information updates relating to the process interaction elements of the first electronic medium;
    dynamically updating the dynamic content of the first electronic medium based on the one or more information updates;
    receiving information specifying a first open action from a first participant among the selected participants who has received the first electronic message; and
    serving the dynamic content, including all then-current updates thereto, to the first participant in response to the first open action;
  the apparatus further comprising:
    means for receiving one or more responses in the interaction region from a participant who is not connected to a network to which the processor, data store, and other participants are connected;
    means for storing the responses in a second data store that is local to the participant and associated with the electronic message; and
    means for dynamically updating the dynamic content in the server based on the one or more responses after the participant is re-connected to the network.

21. An apparatus as recited in claim 20, wherein each of the means is a set of instructions in the memory which, when executed by the processor, cause the processor to carry out the function of the means:
  is a set of instructions in the memory which, when executed by the processor, cause the processor to carry out the steps.

22. An apparatus as recited in claim 20, wherein each of the means is a mail server communicatively coupled to the processor and data store and comprising instructions in the memory which, when executed by the mail server, cause the mail server to carry out the function of the means.

23. An apparatus as recited in claim 20, wherein the process interaction comprises a process interaction selected from among the set consisting of discussion, tracking, purchase, collection, approval, and negotiation.

24. An apparatus as recited in claim 20, wherein the dynamic content comprises a plurality of sets of text corresponding to the one or more information updates.

25. An apparatus as recited in claim 20, wherein the sequences of instructions further comprise instructions that, when executed by the processor, cause the processor to carry out the steps of generating, as part of the electronic medium, a tag associated with a universal resource locator that identifies a location of the dynamic content.

26. An apparatus as recited in claim 20, wherein the sequences of instructions further comprise instructions that, when executed by the processor, cause the processor to carry out the steps of:
  asynchronously receiving one or more second information updates from a data source that is external to the data store and the processor;
  dynamically updating the dynamic content of the first electronic medium based on the one or more second information updates.

27. An apparatus as recited in claim 20, wherein each electronic message further comprises one or more static content regions that define associated static content stored in the data store.

28. An apparatus as recited in claim 20, wherein the first electronic message comprises one or more instructions in a markup language selected from the group consisting of hypertext markup language (HTML), Extensible Mark-up Language (XML), and Standard Generalized Mark-up Language (SGML).

29. An apparatus as recited in claim 28, wherein each of the dynamic content regions is defined by an IFRAME HTML tag or an ILAYER HTML tag.

30. An apparatus as recited in claim 20, wherein the first electronic message comprises a name field that identifies network addresses of the selected participants; a subject field that identifies a subject of the electronic medium; a plurality of static content elements; and a plurality of dynamic content elements that reference dynamic content of the electronic medium.

31. An apparatus as recited in claim 20, wherein the first electronic message comprises a transport envelope, a plurality of static content regions; a plurality of dynamic content regions that reference dynamic content of the electronic medium; and a plurality of MIME elements that delimit the static content regions and dynamic content regions.

* * * * *